United States Patent [19]

Tajima et al.

[11] Patent Number: 4,674,070
[45] Date of Patent: Jun. 16, 1987

[54] OPTICAL TYPE DISC WITH V-SHAPED GROOVE AND OPTICAL TYPE REPRODUCING APPARATUS THEREFOR

[75] Inventors: Osamu Tajima, Ibaraki; Shigehiro Ito, Toride, both of Japan

[73] Assignee: Victor Company of Japan, Ltd., Yokohama, Japan

[21] Appl. No.: 763,905

[22] Filed: Aug. 8, 1985

[30] Foreign Application Priority Data

Aug. 11, 1984 [JP] Japan ............................. 59-167989
Feb. 27, 1985 [JP] Japan ............................. 60-38150
Feb. 27, 1985 [JP] Japan ............................. 60-38151

[51] Int. Cl.$^4$ .......................................... G11B 7/007
[52] U.S. Cl. ................................. 369/46; 369/111; 369/275; 369/109
[58] Field of Search ............... 369/44, 45, 46, 109, 369/110, 111, 275

[56] References Cited

U.S. PATENT DOCUMENTS

| | | | |
|---|---|---|---|
| 4,037,252 | 7/1977 | Janssen | 369/111 |
| 4,310,916 | 1/1982 | Dil | 369/109 |
| 4,325,135 | 4/1982 | Dil et al. | 369/110 |
| 4,553,228 | 11/1985 | Gerard et al. | 369/46 |
| 4,569,038 | 2/1986 | Nagashima et al. | 369/44 |

OTHER PUBLICATIONS

"High Density Optical Disk With V-Shaped Grooves", by Nagashima, Appl. Phys. Lett., vol. 42, No. 2, Jan. 15, 1983.
"Experimental Estimation of an Optical Disk System With V-Shaped Grooves", by Nagashima et al., Appl. Phys. Lett., vol. 43, No. 1, Jul. 1, 1983.
"High Density Optical Disk With V-Shaped Grooves", by Nagashima et al., 13th Optical Engineering Conference.

Primary Examiner—Donald McElheny, Jr.
Attorney, Agent, or Firm—Michael N. Meller

[57] ABSTRACT

An optical type disc is recorded with information signals on each sloping surface of a spiral or concentric V-shaped grooves formed on a recording surface thereof, wherein the information signals are recorded as rows of geometrical depressions or projections on each sloping surface of the V-shaped groove and the inclination angle of the bottom surface of the depression or the top surface of the projection is greater than the inclination angle of the sloping surface of the V-shaped groove. An optical type reproducing apparatus reproduces the signals from the disc by relatively scanning the sloping surface of the V-shaped groove by a reproducing spot having a diameter smaller than the width of the V-shaped groove. The reproducing apparatus comprises tracking spot forming system for forming a tracking spot across two mutually adjacent sloping surfaces of the V-shaped grooves at a position deviated with respect to the reproducing spot in a width direction of the V-shaped groove by a distance of ¼ the width of the V-shaped groove, a photoelectric transducer for independently receiving light reflected from the two mutually adjacent sloping surfaces of the V-shaped grooves, and a moving mechanism for moving an optical system in the width direction of the V-shaped groove responsive to an output of the photoelectric transducer so that the reproducing spot is formed along a predetermined sloping surface of the V-shaped groove.

10 Claims, 66 Drawing Figures

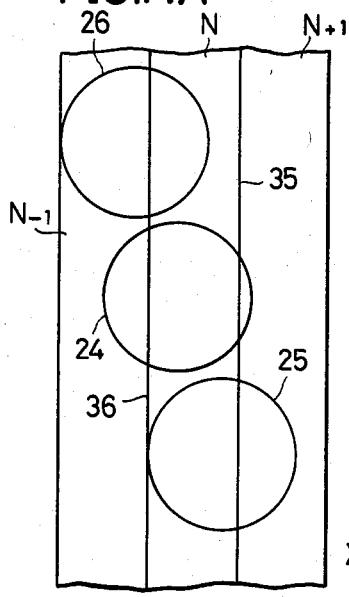
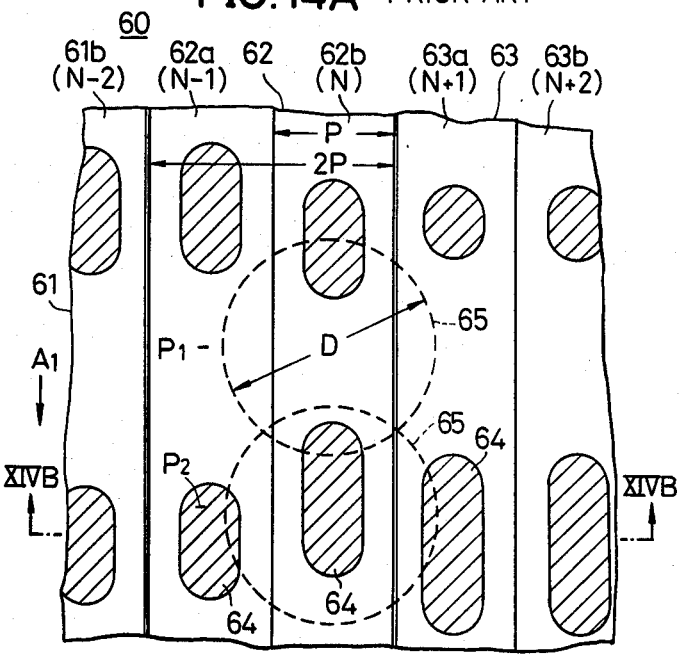
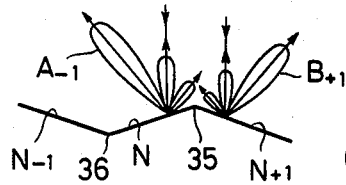
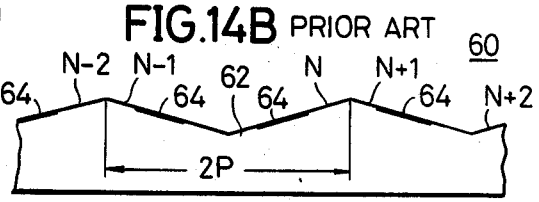
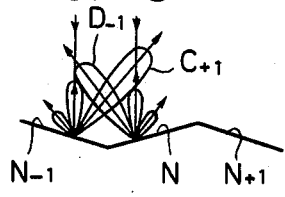
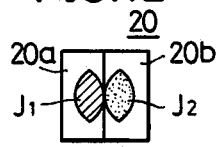
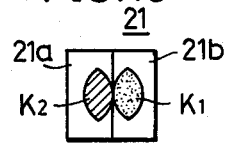

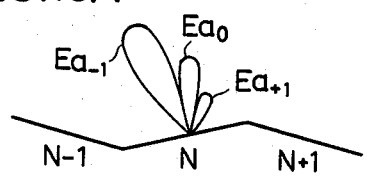
FIG.15A
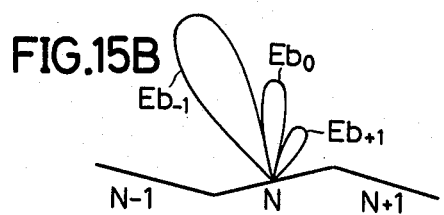
FIG.15B
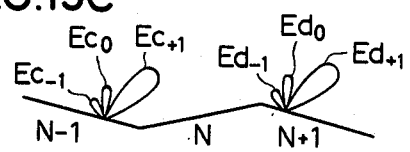
FIG.15C
FIG.15D
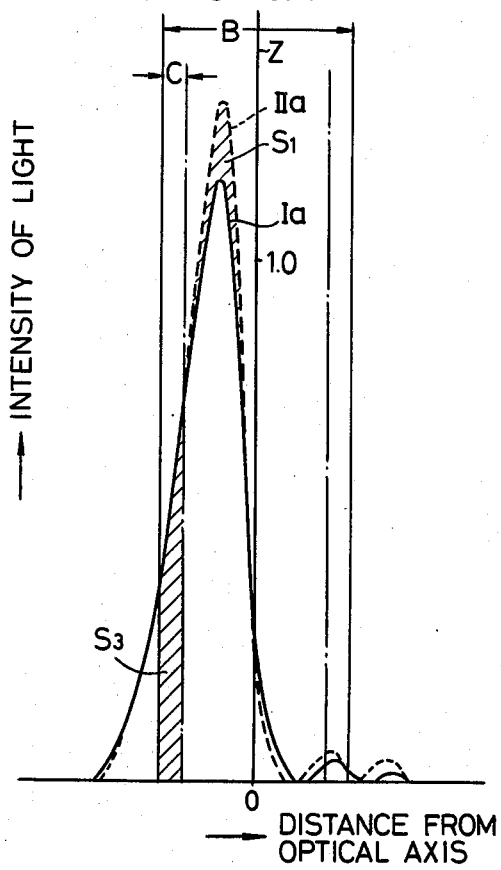
FIG.16A
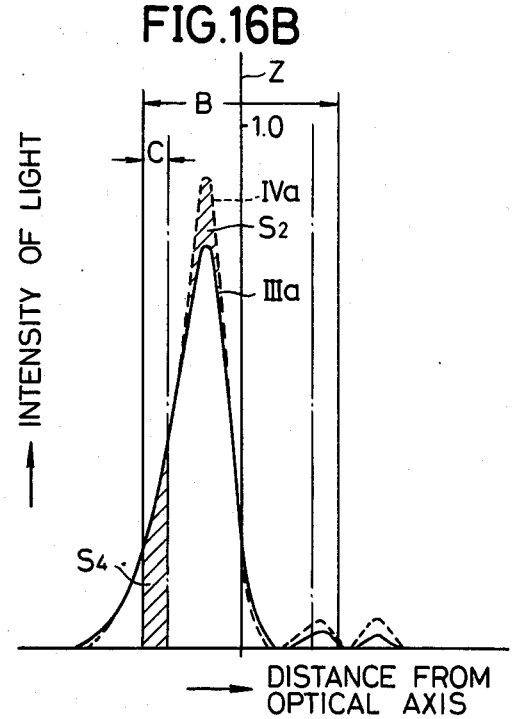
FIG.16B

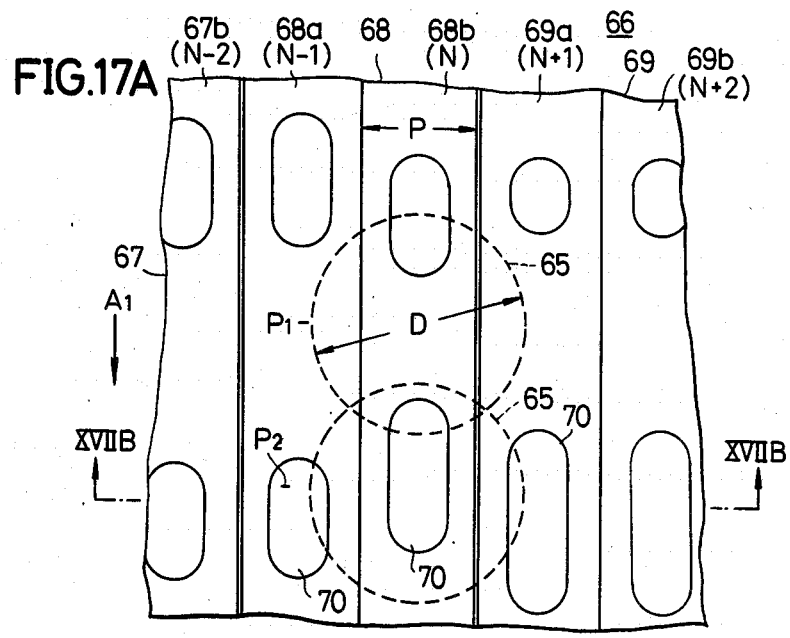
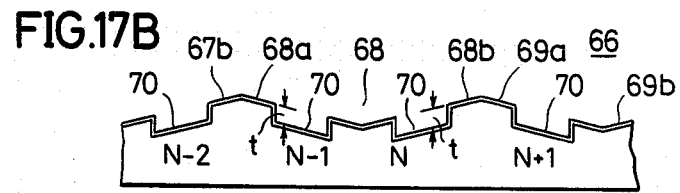
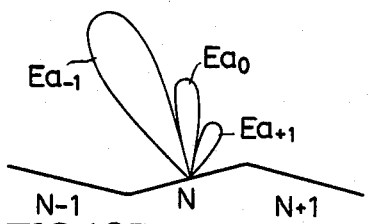
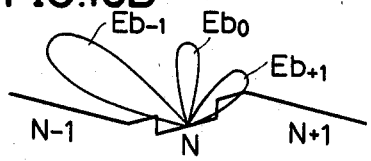
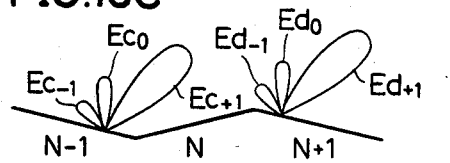
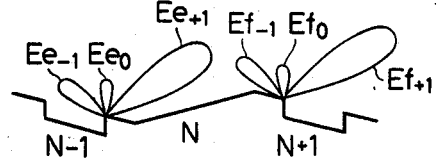

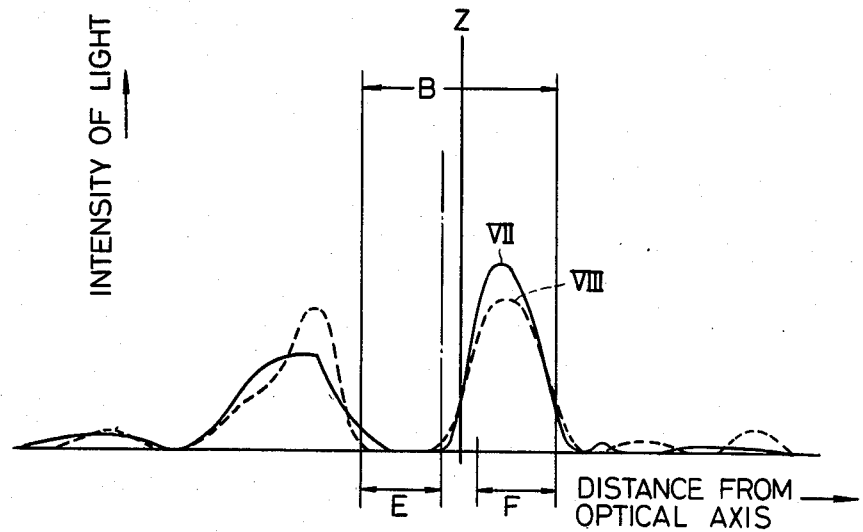
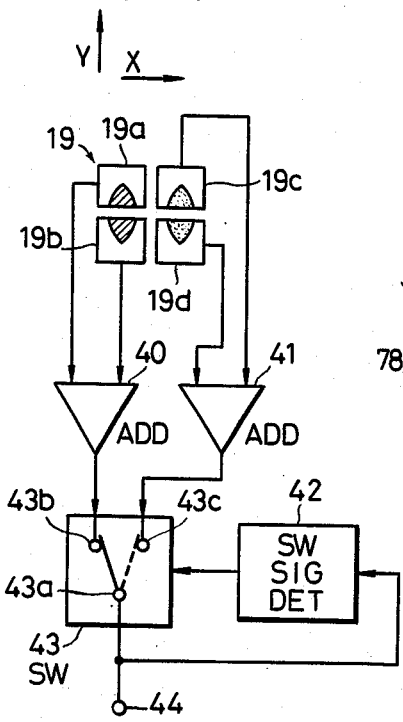
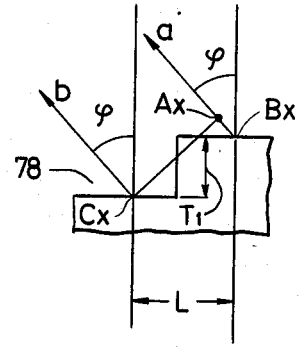
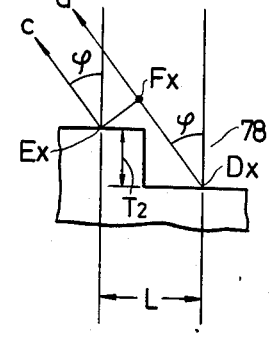

OPTICAL TYPE DISC WITH V-SHAPED GROOVE AND OPTICAL TYPE REPRODUCING APPARATUS THEREFOR

BACKGROUND OF THE INVENTION

The present invention generally relates to optical type discs which are recorded with information signals on each sloping surface of a spiral V-shaped groove or concentric V-shaped grooves formed on a recording surface of the disc and optical type reproducing apparatuses for reproducing the information signals from such discs, and more particularly to an optical type disc which is not recorded with signals exclusively for tracking control and an optical type reproducing apparatus for reproducing the information signals from such a disc in a state where a satisfactory tracking control is carried out.

In a system which relatively scans over a spiral or concentric tracks formed on a recording surface of an optical type disc (hereinafter simply referred to as a disc) by use of a laser beam, for example, information signals are reproduced by detecting the laser beam which is reflected from the recording surface of the disc. Generally, the recording surface of the disc is flat, and a predetermined gap is formed between two mutually adjacent tracks so that a spot of the laser beam on the recording surface does not extend over a track which is adjacent to the track which is being scanned. The recording density of the disc is hence determined by the diameter of the spot of the laser beam on the recording surface. The laser beam is stopped to approximately the diffraction limit, and for this reason, it was thought that the recording density of the existing disc is the limit for this kind of disc.

Recently, various proposals have been made to increase the recording density of the optical type disc. Among such proposals, a disc having a recording density which is approximately twice the recording density of the existing disc was previously proposed in a Japanese Laid-Open Patent Application No. 57-147133. According to this previously proposed disc, a spiral or concentric V-shaped grooves are formed contiguously on the recording surface of the disc, and the information signals are recorded on each sloping surface of the V-shaped grooves. In other words, each V-shaped groove has two sloping surfaces, and each sloping surface constitutes a track. According to this previously proposed disc, the crosstalk from the adjacent tracks is relatively small, and for this reason, the interval between two mutually adjacent tracks can be set to a small value so as to effectively increase the recording density of the disc.

However, the previously proposed disc had problems in controlling the tracking of the laser beam over the correct track. In a first example, signals for tracking control (hereinafter referred to as tracking control signals) are recorded along the peak part and the valley part of each V-shaped groove, and the tracking is controlled responsive to reproduced tracking control signals. However, in this first example, an additional process is required to record the tracking control signals on the disc and the manufacturing cost of the disc becomes high. In addition, the recording density of the disc with respect to the information signals becomes reduced due to the provision of the tracking control signals, and the frequency band of the information signals becomes limited because of the need to reserve a frequency band for the tracking control signals. Further, the construction of the reproducing apparatus becomes complex because of the need to provide circuits for processing the reproduced tracking control signals. In a second example, the V-shaped groove is intentionally made to wobble with a certain frequency, where the quantity of each wobble is considerably small compared to the interval between two mutually adjacent tracks. According to this second example, the tracking control is carried out responsive to a wobbling component in the laser beam which is reflected from the recording surface. However, it is difficult to form such a wobbling V-shaped groove on the recording surface of the disc, and moreover, the construction of the reproducing apparatus becomes complex because of the need to provide circuits for processing the wobbling component.

On the other hand, the information signals are recorded on the optical type disc as variations in the reflectivity of a tellurium suboxide (TeOx) thin film, for example, which thin film is formed on each sloping surface of the V-shaped groove. Accordingly, each sloping surface of the V-shaped groove remains flat even after the information signals are recorded, and thus, it is impossible to duplicate and mass product the disc from an original disc by use of a stamper.

It is possible to duplicate and mass produce the disc from the original disc by use of the stamper, if the information signals were to be recorded on each sloping surface of the V-shaped groove as rows of pits. However, when the depth of the pits are approximately constant as in the case of the conventional disc of the type having the flat recording surface (that is, having no V-shaped groove), the problem of crosstalk occurs at the time of the reproduction as will be described later on in the present specification.

SUMMARY OF THE INVENTION

Accordingly, it is a general object of the present invention to provide a novel and useful optical type disc and an optical type reproducing apparatus, in which the problems described heretofore are eliminated.

Another and more specific object of the present invention is to provide an optical type reproducing apparatus for reproducing information signals from an optical type disc which is recorded with the information signals on each sloping surface of a spiral V-shaped groove or concentric V-shaped grooves formed on a recording surface of the disc, by relatively scanning the sloping surface of the V-shaped groove by a reproducing spot having a diameter smaller than the width of the V-shaped groove. The reproducing apparatus according to the present invention comprises tracking spot forming means for forming a tracking spot across two mutually adjacent sloping surfaces of the V-shaped grooves at a position deviated with respect to the reproducing spot in a width direction of the V-shaped groove by a distance of ¼ the width of the V-shaped groove, photoelectric transducer means for independently receiving light reflected from the two mutually adjacent sloping surfaces of the V-shaped grooves, and moving means for moving an optical system in the width direction of the V-shaped groove responsive to an output of the photoelectric transducer means so that the reproducing spot is formed along a predetermined sloping surface of the V-shaped groove. According to the reproducing apparatus of the present invention, it is possible to reproduce the information signals from the disc in a state where a satisfactory tracking control is carried out, although the disc is not recorded with tracking control signals. In addition, since it is unnecessary to record the tracking control signals on the disc, it is possible to eliminate a process of recording the tracking control signals when manufacturing the disc and the manufacturing cost of the disc can thus be reduced.

Still another object of the present invention is to provide an optical type disc recorded with information signals on each sloping surface of a spiral V-shaped groove or concentric V-shaped grooves formed on a recording surface of the disc, wherein the information signals are recorded as rows of geometrical depressions or projections on each sloping surface of the V-shaped groove and the inclination angle of the bottom surface of the depression or the top surface of the projection is greater than the inclination angle of the sloping surface of the V-shaped groove. According to the disc of the present invention, it is possible at the time of the reproduction to sufficiently reduce the reflected and diffracted light which introduces the crosstalk, at the depression of projection of the tracks which are adjacent to the track which is being scanned. As a result, the problem of crosstalk will not occur. In addition, the disc according to the present invention can be duplicated and mass produced from an original disc by use of a stamper, and the manufacturing cost of the disc is low.

Other objects and further features of the present invention will be apparent from the following detailed decription when read in conjunction with the accompanying drawings.

BRIEF DESCRIPTION OF THE DRAWINGS

FIG. 11A is an enlarged plan view showing the relationship between the tracking spots and the V-shaped grooves in a state where a tracking error occurs in the direction of the track N−1;

FIGS. 11B and 11C show reflection and diffraction states of the first and second tracking spots for the case shown in FIG. 11A, respectively;

FIGS. 12 and 13 respectively show irradiation patterns on light receiving surfaces of a light receiving element provided for the tracking;

FIG. 14A is a plan view showing a part of an example of a conventional disc on an enlarged scale;

FIG. 14B shows the disc shown in FIG. 14A in a cross section along a line XIVB—XIVB;

FIGS. 15A through 15D show reflection and diffraction states for the case where the disc shown in FIGS. 14A and 14B is played;

FIGS. 16A and 16B are graphs showing a diffraction distribution for the case where the reproducing spot irradiates a recorded part on the track N of the disc shown in FIGS. 14A and 14B and a diffraction distribution for the case where the reproducing spot irradiates an unrecorded part on the track N of the disc shown in FIGS. 14A and 14B, respectively;

FIG. 17A is a plan view showing a part of an example of a conceivable disc on an enlarged scale;

FIG. 17B shows the disc shown in FIG. 17A in a cross section along a line XVIIB—XVIIB;

FIGS. 18A through 18D show reflection and diffraction states for the case where the disc shown in FIGS. 17A and 17B is played;

FIGS. 23A and 23B are graphs showing a diffraction distribution for the case where the reproducing spot irradiates a non-pit part on the track N of the disc shown in FIGS. 19A and 19B and a diffraction distribution for the case where the reproducing spot irradiates a pit part on the track N of the disc shown in FIGS. 19A and 19B, respectively;

FIG. 24 is a system block diagram generally showing an essential part of a second embodiment of the optical type reproducing apparatus according to the present invention;

FIGS. 25A and 25B respectively show reflection and diffraction states at end parts of the pit;

DETAILED DESCRIPTION

Figure 1:
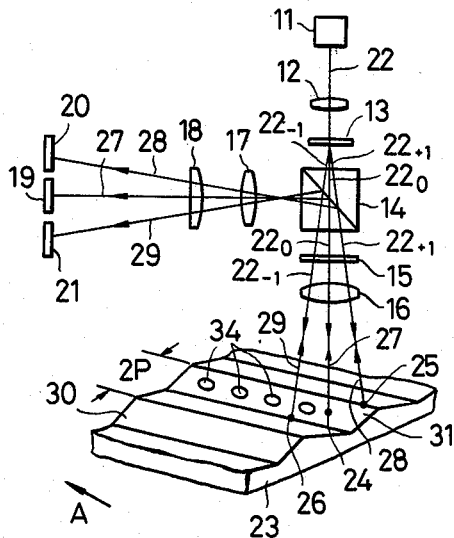
FIG. 1 generally shows a first embodiment of the optical type reproducing apparatus according to the present invention.

First, description will be given with respect to the first embodiment of the optical type reproducing apparatus according to the present invention. FIG. 1 generally shows the first embodiment of the reproducing apparatus according to the present invention together with a part of an optical type disc which is shown on an enlarged scale. The reproducing apparatus generally comprises a light source 11 such as a semiconductor laser source, a collimator lens 12, a diffraction grating 13, a polarizing prism 14, a quarter wave plate 15, a condenser lens 16, a lens 17, a cylindrical lens 18, and light receiving elements 19, 20, and 21.

A laser beam 22 from the light source 11 is passed through the collimator lens 12 and parallel light from the collimator lens 12 enters the diffraction grating 13. The parallel light is divided into a central 0-th order (or simply 0-th) diffracted light $22_0$, and $-1$-st and $+1$-st order (or simply $-1$-st and $+1$-st) diffracted lights $22_{-1}$ and $22_{+1}$. The diffracted lights are transmitted through the polarizing prism 14, and the linearly polarized light is converted into circularly polarized light by the quarter wave plate 15. The circularly polarized light is condensed by the condenser lens 16 and is imaged on a recording surface of an optical type disc 23 as a reproducing spot 24 and first and second tracking spots 25 and 26.

Reflected lights 27, 28, and 29 from the recording surface of the disc 23 are transmitted through the condenser lens 16, and parallel light from the condenser lens 16 enters the quarter wave plate 15. Linearly polarized light from the quarter wave plate 15 is perpendicular to the incident light. The reflected lights 27, 28, and 29 are reflected by the polarizing prism 14 and converged by the lens 17. Light from the lens 17 is transmitted through the cylindrical lens 18 and is irradiated on the respective light receiving elements (photoelectric transducer means) 19, 20, and 21.

The disc 23 has a spiral V-shaped groove formed on the recording surface thereof, and information signals are recorded on each sloping surface of the V-shaped groove as variations in the reflectivity. One track is constituted by each sloping surface of the V-shaped groove for one revolution of the disc 23. The disc 23 is not recorded with tracking control signals.

Figure 2A:
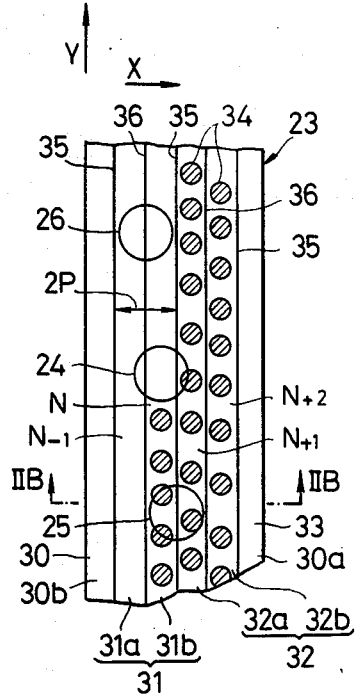
FIG. 2A is a plan view showing a part of a disc on an enlarged scale together with a reproducing spot and tracking spots.
Figure 2B:
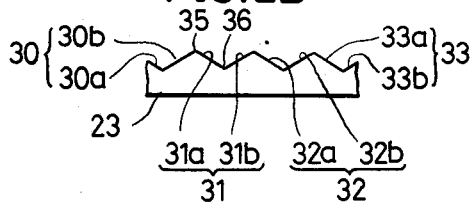
FIG. 2B shows the disc shown in FIG. 2A in a cross section along a line IIB—IIB.

FIGS. 1, 2A and 2B show a part of the disc 23 on an enlarged scale. V-shaped grooves 30, 31, 32, and 33 are parts of the spiral V-shaped groove, and the V-shaped grooves 30 through 33 are each formed with a width 2P. Each of sloping surfaces 30a, 30b, 31a, ..., and 33b is recorded with the information signals as recorded parts 34. The information signals are recorded from the outer periphery of the disc 23 towards the inner periphery thereof, and the sloping surfaces 31a, 31b, and 32a constitute tracks $N-1$, N, and $N+1$, respectively. A peak part 35 is formed by two mutually adjacent sloping surfaces of two mutually adjacent V-shaped grooves such as the sloping surfaces 30b and 31a, and a valley part 36 is formed by two mutually adjacent sloping surfaces of the same V-shaped groove such as the sloping surfaces 31a and 31b.

Figure 3:
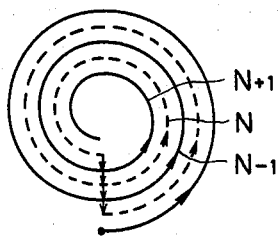
FIG. 3 shows a relative scanning locus of the reproducing spot on the disc.

The disc 23 is rotated in the direction of an arrow A, and the reproducing spot 24 scans along a locus shown in FIG. 3. That is, the reproducing spot 24 repeats an operation of scanning one track, returning in the outer periphery of the disc 23 by one track, and then scanning one track. The reproducing spot 24 must return in the outer periphery of the disc 23 by one track every time one track is scanned, since the V-shaped groove is formed spirally and the tracks are constituted by each of the sloping surfaces of the V-shaped groove. Hence, the reproducing spot 24 scans the tracks $N-1$, N, and $N+1$ in this sequence.

Figure 4:
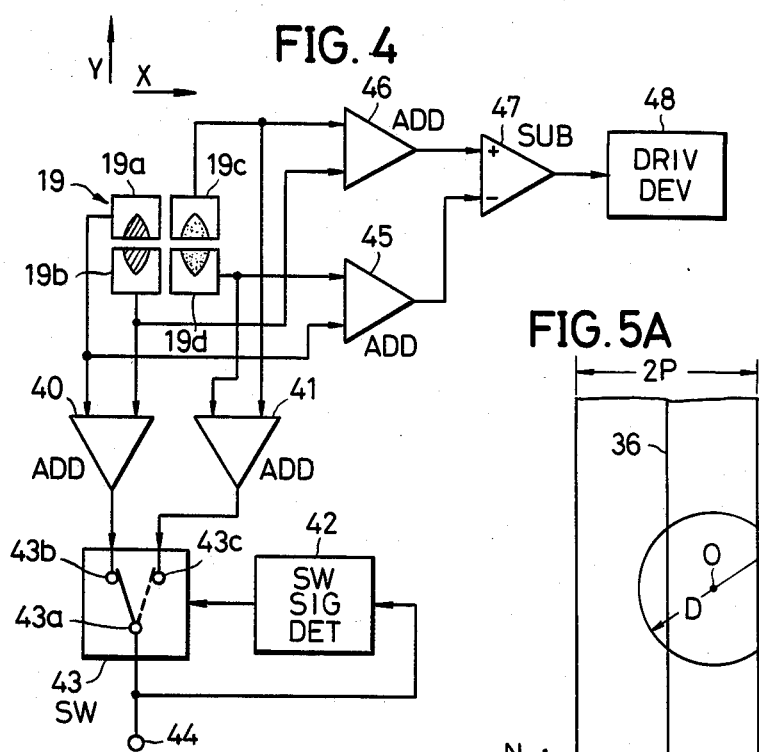
FIG. 4 is a system block diagram showing a signal reproducing system and a focus control system of the reproducing apparatus according to the present invention.

As shown in FIG. 4, the light receiving element 19 is divided into four light receiving surfaces 19a through 19d which are distributed in the width direction X of the V-shaped groove and in the extending direction Y of the V-shaped groove.

Figure 5A:
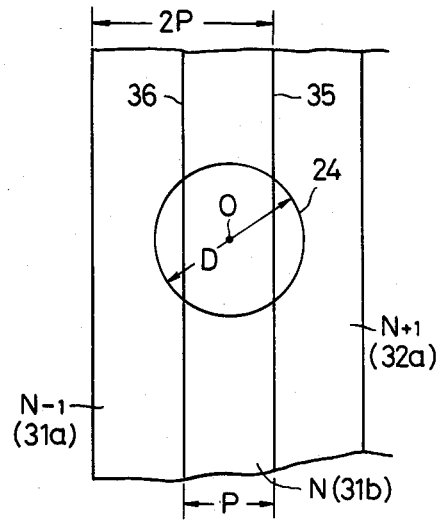
FIG. 5A is an enlarged plan view showing the reproducing spot in a state where a track N is being scanned.
Figure 5B:
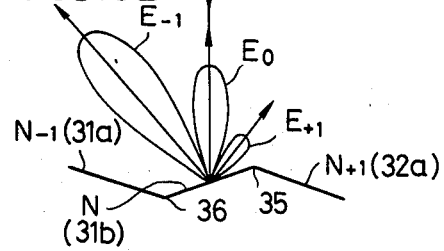
FIGS. 5B and 5C show a reflection and diffraction state of the reproducing spot on the track N and a reflection and diffraction state of the reproducing spot on tracks adjacent to the track N, respectively.
Figure 5C:
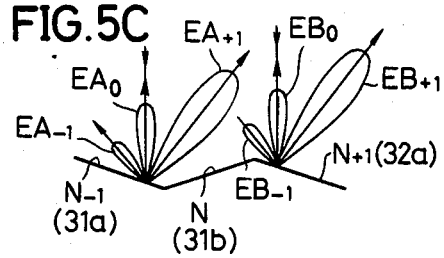

When the reproducing spot 24 is scanning over the track N as shown in FIGS. 2A and 5A, the 0-th diffracted light $22_0$ which is the incident light, is reflected and diffracted as shown schematically in FIGS. 5B and 5C. In the drawings of the present application, the diffracted light is illustrated schematically in the form of an oval, and the larger the oval the larger the intensity of the diffracted light. As shown in FIG. 5A, the reproducing spot 24 has a center O, and the diameter D, of the reproducing spot 24 is greater than the width P of the track N but is smaller than the width 2P of the V-shaped groove 31. Hence, the reproducing spot 24 scans over the track N and a part of the adjacent tracks $N-1$ and $N+1$.

The light reflected by the track N (sloping surface 31b) causes $-1$-st, 0-th, and $+1$-st diffractions. Since the geometrical reflecting direction of light on the track N coincides with the $-1$-st diffracting direction, the intensity of the $-1$-st diffracted light becomes the maximum. Hence, as shown in FIG. 5B, the intensity of a $-1$-st diffracted light $E_{-1}$ is the maximum and the intensities of 0-th diffracted light $E_0$ and $+1$-st diffracted light $E_{+1}$ are small compared to that of the $-1$-st diffracted light $E_{-1}$.

The light reflected by the track $N-1$ (sloping surface 31a) causes diffractions as indicated by diffracted lights $EA_{-1}$, $EA_0$, and $EA_{+1}$ in FIG. 5C, and the light reflected by the track $N+1$ (sloping surface 32a) causes diffractions as indicated by diffracted lights $EB_{-1}$, $EB_0$, and $EB_{+1}$ in FIG. 5C. Unlike the track N, the geometrical reflecting directions of lights on the tracks $N-1$ and $N+1$ coincide with the $+1$-st diffracting direction. For this reason, the intensities of the $+1$-st diffracted lights $EA_{+1}$ and $EB_{+1}$ are considerably large compared to the intensities of the $-1$-st diffracted lights $EA_{-1}$ and $EB_{-1}$ and the 0-th diffracted lights $EA_0$ and $EB_0$.

Figure 6A:
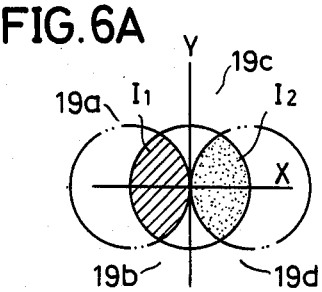
FIGS. 6A and 6B show irradiation patterns on light receiving surfaces of a light receiving element in a focused state and an off-focus state, respectively.

A part of the diffracted light from the tracks N, $N-1$, and $N+1$ does not enter the condenser lens 16, and the remainder of the diffracted light is transmitted through the condenser lens 16 and is irradiated on the light receiving element 19. In other words, the light distribution on the light receiving element 19 becomes as shown in FIG. 6A wherein an irradiated part $I_1$ of the $-1$-st diffracted light $E_{-1}$ is indicated by hatchings and an irradiated part $I_2$ of the +1-st diffracted lights $EA_{+1}$ and $EB_{+1}$ is indicated by a dot pattern within a circular region which is limited by the aperture of the condenser lens 16. In FIG. 6A, two-dot chain lines indicate diffracted light which does not enter the condenser lens 16. As may be seen from FIG. 6A, the irradiated part $I_1$ extends over the light receiving surfaces 19a and 19b, and the irradiated part $I_2$ extends over the light receiving surfaces 19c and 19d. The information signals recorded on the track N which is being scanned, is reproduced by selectively obtaining only the outputs of the light receiving surfaces 19a and 19b. As shown in FIG. 4, the light receiving surfaces 19a and 19b are coupled to an adder 40, and the light receiving surfaces 19c and 19d are coupled to an adder 41. These adders 40 and 41 are coupled to a switch 43 which is switched responsive to an output of a switching signal detector 42 which detects a switching signal within the reproduced signal. For example, the switching signal is recorded at a predetermined position on the disc 23 at a rate of once per revolution of the disc 23, and is used to return the scan in the outer periphery of the disc 23 as described before in conjunction with FIG. 3. A moving contact 43a of the switch 43 is connected to a terminal 43b when scanning over the track N, and only the outputs of the light receiving surfaces 19a and 19b out of the light receiving surfaces 19a through 19d are passed through the switch 43 and obtained from a terminal 44. In other words, when scanning over the track N, the signals reproduced from the adjacent tracks $N-1$ and $N+1$ are not included in the reproduced signal obtained from the terminal 44.

Figure 7A:
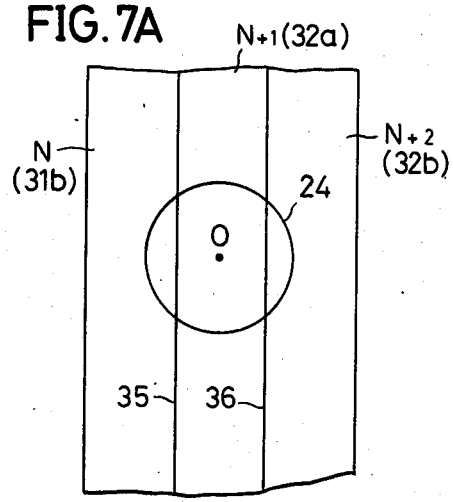
FIG. 7A is an enlarged plan view showing the reproducing spot in a state where a track N+1 is being scanned.
Figure 7B:
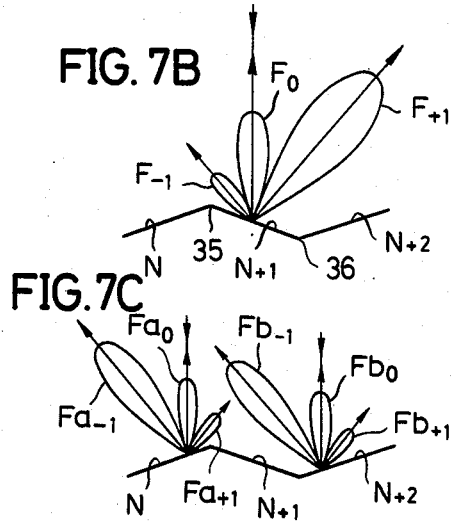
FIGS. 7B and 7C show a reflection and diffraction state of the reproducing spot on the track N+1 and a reflection and diffraction state of the reproducing spot on tracks adjacent to the track N+1, respectively.
Figure 7C:
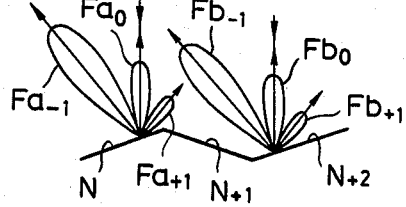

Next, description will be given with respect to the reflection and diffraction state and the method of obtaining the reproduced signal when the reproducing spot 24 scans over the subsequent track $N+1$, by referring to FIGS. 7A through 7C.

The reproducing spot 24 extends over the track $N+1$ and a part of the adjacent tracks N and $N+2$. The geometrical reflecting direction of light on the track $N+1$ (sloping surface 32a) coincides with the +1-st diffracting direction, and the intensity of the +1-st diffracted light is the maximum. The intensities of −1-st diffracted light $F_{-1}$, 0-th diffracted light $F_0$, and +1-st diffracted light $F_{+1}$ becomes as shown in FIG. 7B. On the other hand, the geometrical reflecting directions of lights on the tracks N and $N+2$ coincide with the −1-st diffracting direction. For this reason, the intensities of the −1-st diffracted lights $Fa_{-1}$ and $Fb_{-1}$ are considerably large compaed to the intensities of the 0-th diffracted lights $Fa_0$ and $Fb_0$ and the +1-st diffracted lights $Fa_{+1}$ and $Fb_{+1}$ as shown in FIG. 7C.

The diffracted light is irradiated on the light receiving element 19, and the irradiated part $I_1$ of the −1-st diffracted lights $Fa_{-1}$ and $Fb_{-1}$ and the irradiated part $I_2$ of the +1-st irradiated light $F_{+1}$ are formed similarly as in the case shown in FIG. 6A. In this case, the moving contact 43a of the switch 43 is switched to a terminal 43c responsive to the output of the switching signal detector 42. As a result, only the outputs of the light receiving surfaces 19c and 19d are passed through the switch 43 and is obtained from the terminal 44. Hence, only the signals reproduced from the track $N+1$ which is being scanned, is obtained from the terminal 44.

Accordingly, only the signals reproduced from the track which is being scanned is obtained from the terminal 44, and the disc 23 is played in a satisfactory state where the crosstalk from the adjacent tracks is sufficiently suppressed.

Next, description will be given with respect to the focus control employing the known astigmatic focusing method.

In FIG. 4, the outputs of the diagonally arranged light receiving surfaces 19a and 19d are added in an adder 45, and the outputs of the diagonally arranged light receiving surfaces 19b and 19c are added in an adder 46. Outputs of the adders 45 and 46 are supplied to a substracting circuit 47. The subtracting circuit 47 generates an error signal between the sums of the outputs of two pairs of diagonally arranged light receiving surfaces, and this error signal is supplied to a driving device 48 as a focus error signal.

Figure 6B:
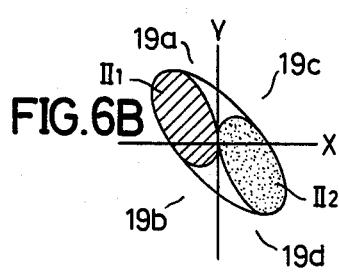

In a focused state, the irradiated pattern on the light receiving element 19 is a circular pattern as shown in FIG. 6A, and the focus error signal is zero. On the other hand, when the focus is off in one direction, the irradiated pattern on the light receiving element 19 becomes an oval pattern as shown in FIG. 6B, irradiated parts $II_1$ and $II_2$ of the light receiving surfaces 19a and 19d increase, and a focus error signal $-V$ is generated. When the focus is off in a direction opposite to the one direction, irradiated parts of the light receiving surfaces 19b and 19c increase and a focus error signal $+V$ is generated. The driving device 48 is operated responsive to the focus error signal, the focus control is carried out by displacing the condenser lens 16 shown in FIG. 1 in the direction of the optical axis so that the focus error signal becomes a zero.

Next, description will be given with respect to the tracking control which forms an essential part of the reproducing apparatus according to the present invention.

First, the mounting angle of the diffraction grating 13 is appropriately set so that the spots 24, 25, and 26 are formed as shown in FIG. 2A. That is, when the center O of the reproducing spot 24 is positioned at the center of the track N, the center of the first tracking spot 25 coincides with the peak part 35 which constitutes a boundary between the tracks N and $N+1$, and the center of the second tracking spot 26 coincides with the valley part 36 which constitutes a boundary between the tracks N and $N-1$. The first and second tracking spots 25 and 26 are formed before and after the reproducing spot 24 in the relative scanning direction, and moreover, the first and second tracking spots 25 and 26 are formed at positions deviated from the reproducing spot 24 in the width direction of the V-shaped groove by a distance of $\frac{1}{4}$ the width 2P of the V-shaped groove. The centers of the spots 24, 25, and 26 are arranged in a line. The diffraction grating 13 is designed so that the intensities of the diffracted lights $22_{+1}$ and $22_{-1}$ which form the first and second tracking spots 25 and 26 are sufficiently small compared to the intensity of the diffracted light $22_0$ which forms the reproducing spot 24, and the tracking spots 25 and 26 will not interfere with the reproduction carried out by the reproducing spot 24.

Figure 8:
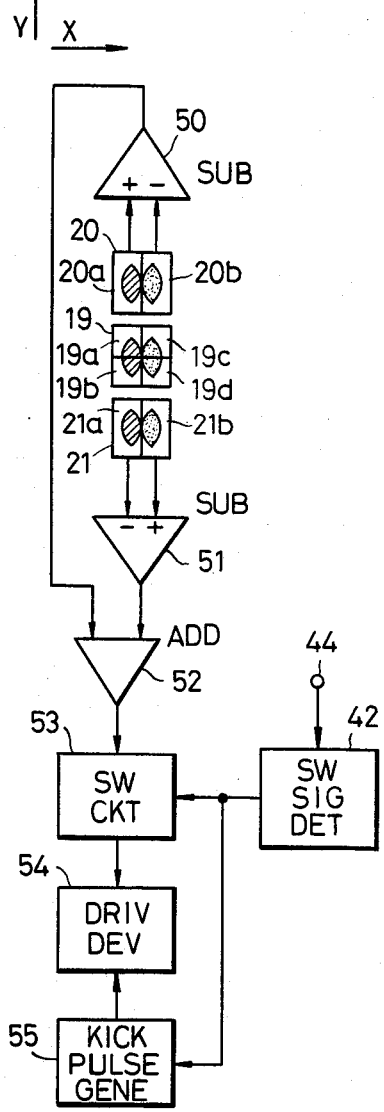
FIG. 8 is a system block diagram showing a tracking control system of the reproducing apparatus according to the present invention.

As shown in FIG. 8, the light receiving elements 20 and 21 for receiving the respective reflected lights 28 and 29 which form the tracking spots 25 and 26, are divided in the direction Y and comprise light receiving surfaces 20a, 20b, 21a, and 21b.

Description will now be given with respect to the reflection and diffraction states of the lights which form the tracking spots 25 and 26 and are reflected by the recording surface of the disc 23, for the case where the center of the reproducing spot 24 coincides with the center of the track N and for the case where the center of the reproducing spot 24 is deviated from the center of the track N, by referring to FIGS. 9A through 11C.

The first tracking spot 25 is formed over the tracks N and N+1, and the light forming the spot 25 is reflected from the tracks N and N+1. The reflection and diffraction states are shown in FIGS. 9B, 10B, and 11B. The second tracking spot 26 is formed over the tracks N−1 and N, and the light forming the spot 26 is reflected from the tracks N−1 and N. The reflection and diffraction states are shown in FIGS. 9C, 10C, and 10C. The geometrical reflecting direction of light on the track N coincides with the −1-st diffracting direction, and the geometrical reflecting directions of lights on the tracks N−1 and N+1 coincide with the +1-st diffracting direction. The diffracted lights coinciding with the diffracting direction make up the majority of the reflected lights, and for this reason, description will hereinafter be given by noting the diffracted lights which make up the majority of the reflected lights (that is, the −1-st diffracted lights $A_{-1}$ and $D_{-1}$ and the +1-st diffracted lights $B_{+1}$ and $C_{+1}$) and neglecting other reflected lights.

Figure 9A:
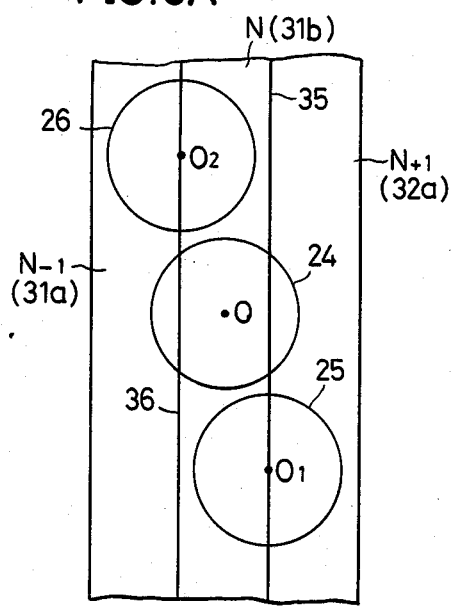
FIG. 9A is an enlarged plan view showing the relationship between tracking spots and V-shaped grooves in a state where a correct tracking is achieved.
Figure 9B:
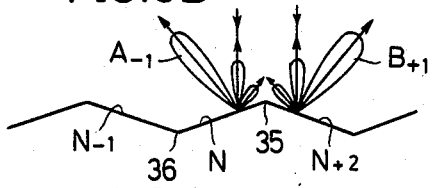
FIGS. 9B and 9C show reflection and diffraction states of first and second tracking spots, respectively.
Figure 9C:
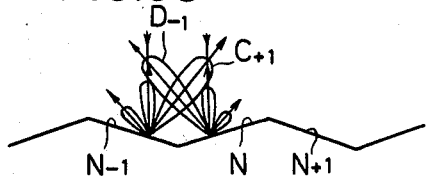

As shown in FIG. 9A, when the center O of the reproducing spot 24 coincides with the center of the track N, a center $O_1$ of the first tracking spot 25 coincides with the peak part 35, and the first tracking spot 25 is equally formed over the tracks N and N+1. Hence, the intensity of the −1-st diffracted light $A_{-1}$ from the track N and intensity of the +1-st diffracted light $B_{+1}$ from the track N+1 are the same as shown in FIG. 9B.

As shown in FIG. 12, the −1-st diffracted light $A_{-1}$ irradiates a part $J_1$ of the light receiving surface 20a of the light receiving element 20 as indicated by the hatchings, and the +1-st diffracted light $B_{-1}$ irradiates a part $J_2$ of the light receiving surface 20b as indicated by the dot pattern. The areas of the irradiated parts $J_1$ and $J_2$ are the same. Since the intensities of the −1-st diffracted light $A_{-1}$ and the +1-st diffracted light $B_{+1}$ are the same, voltages of the same level are obtained from the light receiving surfaces 20a and 20b.

A center $O_2$ of the second tracking spot 26 coincides with the valley part 36, and the second tracking spot 26 is equally formed over the tracks N−1 and N. Hence, the intensity of the +1-st diffracted light $C_{+1}$ from the track N−1 and intensity of the −1-st diffracted light $D_{-1}$ from the track N are the same as shown in FIG. 9B.

As shown in FIG. 13, the +1-st diffracted light $C_{+1}$ irradiates a part $K_1$ of the light receiving surface 21b of the light receiving element 21 as indicated by the dot pattern, and the −1-st diffracted light $D_{-1}$ irradiates a part $K_2$ of the light receiving surface 21a as indicated by the hatchings. The areas of the irradiated parts $K_1$ and $K_2$ are the same. Since the intensities of the +1-st diffracted light $C_{+1}$ and the −1-st diffracted light $D_{-1}$ are the same, voltages of the same level are obtained from the light receiving surfaces 21a and 21b. These voltages obtained from the light receiving surfaces 21a and 21b have the same level as the voltages obtained from the light receiving surfaces 20a and 20b.

Figure 10A:
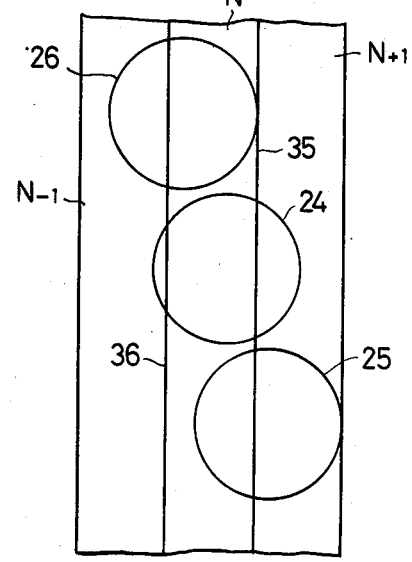
FIG. 10A is an enlarged plan view showing the relationship between the tracking spots and the V-shaped grooves in a state where a tracking error occurs in the direction of the track N+1.
Figure 10B:
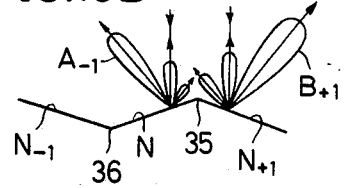
FIGS. 10B and 10C show reflection and diffraction states of the first and second tracking spots for the case shown in FIG. 10A, respectively.
Figure 10C:
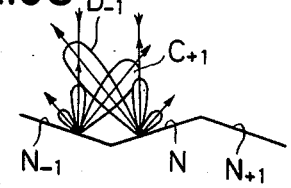

When the center O of the reproducing spot 24 deviates toward the track N+1 as shown in FIG. 10A, the tracking spots 25 and 26 also deviate in this direction. In this case, the area of the track N+1 scanned by the first tracking spot 25 becomes larger than the area of the track N scanned by the spot 25. As a result, the intensity of the +1-st diffracted light $B_{+1}$ from the track N+1 increases and the intensity of the −1-st diffracted light $A_{-1}$ from the track N decreases as shown in FIG. 10B. The irradiated pattern shown in FIG. 12 does not change. Accordingly, the level of the output voltage of the light receiving surface 20b increases and the level of the output voltage of the light receiving surface 20a decreases. On the other hand, the area of the track N scanned by the second tracking spot 26 becomes larger than the area of the track N−1 scanned by the spot 26. As a result, the intensity of the +1-st diffracted light $C_{+1}$ from the track N−1 decreases and the intensity of the −1-st diffracted light $D_{-1}$ from the track N increases. The irradiated patter shown in FIG. 13 does not change. Thus, the level of the output voltage of the light receiving surface 21a increases and the level of the output voltage of the light receiving surface 21b decreases.

On the other hand, when the center O of the reproducing spot 24 deviates toward the track N−1 as shown in FIG. 11A, the first tracking spot 25 extends over a larger area of the track N. Accordingly, the intensity of the −1-st diffracted light $A_{-1}$ from the track N increases and the intensity of the +1-st diffracted light $B_{+1}$ from the track N+1 decreases as shown in FIG. 11B. As a result, the level of the output voltage of the light receiving surface 20a increases and the level of the output voltage of the light receiving surface 20b decreases. The second tracking spot 26 extends over a larger area on the track N−1 as shown in FIG. 11A, and the intensity of the +1-st diffracted light $C_{+1}$ from the track N−1 increases and the intensity of the −1-st diffracted light $D_{-1}$ from the track N decreases as shown in FIG. 11C. Therefore, the level of the output voltage of the light receiving surface 21b increases and the level of the output voltage of the light receiving surface 21a decreases.

A voltage having a level in accordance with the area of the track scanned by the tracking spots 25 and 26, is obtained from each of the light receiving surfaces 20a, 20b, 21a, and 21b. Hence, an error voltage (difference) between the output voltage of the light receiving surface 20a (or 21a) and the output voltage of the light receiving surface 20b (or 21b) can be used as a tracking error signal, and the tracking control can be carried out by moving the optical system in the width direction of the V-shaped groove so that the tracking error signal becomes zero. Further, it is possible to obtain the tracking error signal by adding the difference between the output voltages of the light receiving surfaces 20a and 20b and the difference between the output voltages of the light receiving surfaces 21a and 21b, and carry out the tracking control by moving the optical system so that the tracking error signal becomes zero. According to the latter method of carrying out the tracking control, the signal-to-noise (S/N) ratio of the tracking error signal is high and it is possible to carry out a stable the tracking control. For this reason, this latter method is employed in the present embodiment.

That is, in FIG. 8, the output of the light receiving surface 20b is subtracted from the output of the light receiving surface 20a in a subtracting circuit 50, and the output of the light receiving surface 21a is subtracted from the output of the light receiving surface 21b in a subtracting circuit 51. The output of the light receiving surface 20b is subtracted in the subtracting circuit 50 and the output of the light receiving surface 21a is subtracted in the subtracting circuit 51 because the output voltages of the light receiving surfaces 21a and 21b undergo opposite changes to those of the output voltages of the respective light receiving surfaces 20a and 20b. Outputs of the subtracting circuits 50 and 51 are added in an adder 52. An output of the adder 52, which is the sum of the output voltages of the subtracting circuit 50 and 51, is obtained as the tracking error signal.

The tracking error signal is passed through a switching circuit 53 which can invert the polariety of the signal, and is supplied to a driving device 54. The driving device 54 moves the condenser lens 16 in the width direction of the V-shaped groove responsive to the tracking error signal.

When the reproducing spot 24 scans over the subsequent track N+1, the center $O_1$ of the first tracking spot 25 coincides with the valley part 36 and the center $O_2$ of the second tracking spot 26 coincides with the peak part 35. Hence, the relationship between the direcion of the tracking error and the changing direction of the output level of the light receiving elements 20 and 21 becomes opposite to that during the scanning of the track N. For this reason, it is necessary to invert the polarity of the tracking error signal when scanning over the track N+1.

The switching circuit 53 is switched between a noninverting state and an inverting state responsive to the output signal of the switching signal detector 42 shown in FIG. 8. The switching circuit 53 is switched to the inverting state responsive to the detection signal which is obtained from the switching signal detector 42 when the track which is scanned changes from the track N to the track N+1. Hence, while the track N+1 is being scanned, the output signal of the adder 52 is inverted into a correct tracking error signal in the switching circuit 53, and the correct tracking error signal is supplied to the driving device 54 so as to carry out the tracking control.

The output direction signal of the switching signal detector 42 is also supplied to a kick pulse generating circuit 55, and an output kick pulse of the kick pulse generating circuit 55 is supplied to the driving device 54. The driving device 54 is operated in steps responsive to the kick plate, and for example, the condenser lens 16 is moved in the outer peripheral direction of the disc 23 by a distance P (the width of one track) responsive to the kick pulse.

Detailed description on the switching signal detector 42, the switching circuit 53, and the kick pulse generating circuit 55 will not be given in the present specification, since these circuits are known to those skilled in the art. For example, a U.S. Pat. No. Re. 31,160 discloses circuits which may be used for these circuits. The switching signal detector 42 corresponds to a bandpass amplifier 81 shown in the patent, the switching circuit 53 corresponds to the gate switching circuit 84 shown in the patent, and the kick pulse generating circuit 55 corresponds to the detecting circuit 86 and the monostable multivibrator 87 shown in the patent.

As described before, the switching signal is recorded on the disc 23 at the rate of once per revolution of the disc 23, and the recorded positions of the switching signal are radially aligned. The switching signal can be recorded as a variation in the depth of the V-shaped groove or as a zigzag format, for example.

Therefore, the switching of the reproduced signal between the added output obtained fromt he light receiving surfaces 19a and 19b and the added output obtained from the light receiving surfaces 19c and 19d, the switching of the polarity of the tracking error signal, and the returing of the scan by the width of one track, are simultaneously carried out responsive to the output detection signal of the switching signal detector 42. Thus, the information signals are optically reproduced from the disc 23 in a state where the focus and tracking are controlled satisfactorily.

The reproducing apparatus according to the present invention is also applicable to an optical type disc on which the V-shaped grooves are formed concentrically on the recording surface thereof, but description on this type of a disc will be omitted in the present specification. When playing this type of a disc, the scanning locus becomes different from that shown in FIG. 3, but the information signals are reproduced from the disc similarly as in the case described heretofore. In this case, the disc is played by scanning over one of the sloping surfaces of a V-shaped groove, scanning over the other sloping surface of the same V-shaped groove, scanning over one of the sloping surfaces of the subsequent V-shaped groove, and so on.

Next, description will be given with respect to the problems of the conventional disc. FIGS. 14A and 4B show an example of a conventional disc. A disc 60 comprises a V-shaped groove formed spirally on the recording surface thereof. FIGS. 14A and 15B show V-shaped grooves 61 through 63 which form a part of the spirally formed V-shaped groove. The information signals are recorded on sloping surfaces 61b through 63b of the respective V-shaped grooves 61 through 63 as variations in the reflectivity. Recorded parts 64 on the sloping surfaces are indicated by the hatchings, and the reflectivity of the recorded parts 64 is higher than the reflectivity of unrecorded parts on the sloping surfaces. The sloping surfaces 61b though 63b constitute the tracks N−2 through N+2, respectively.

The sloping surfaces 61b through 63b of the V-shaped grooves 61 through 63 remain flat even after the information signals are recorded on the disc 60. For this reason, there is a problem in that it is impossible to duplicate and mass produce the disc 60 from an original disc by use of a stamper as is done in the case of a conventional audio record disc.

In addition to the above problem, there are the following problems when playing the disc 60.

The information signals are reproduced from the disc 60 as a reproducing spot 65 scans over the tracks in the direction of an arrow $A_1$. For example, the diameter D of the reproducing spot 65 is smaller than the width 2P of the V-shaped groove 62 but is greater than the width P of the sloping surface 62b. When the reproducing spot 65 scans over the track N and assumes a position $P_1$ where the unrecorded part is irradiated by the reproducing spot 65, the reflection and diffraction state on the track N (sloping surface 62b) becomes as shown in FIG. 15A. FIG. 15A shows 0-th diffracted light $Ea_0$, −1-th diffracted light $Ea_{-1}$, and +1-th diffracted light $Ea_{+1}$. When the reproducing spot 65 moves to a position $P_2$ and the recorded part 64 is irradiated by the reproducing spot 65, 0-th diffracted light $Eb_0$, −1-th diffracted light $Eb_{-1}$, and +1-th diffracted light $Eb_{+1}$ shown in FIG. 15B are obtained and the intensities of the diffracted lights increase. In other words, the intensity of the diffracted light changes as the reproducing spot 65 scans, that is, the quantity of light passing through the condenser lens and irradiated on the light receiving element changes as the reproducing spot 65 scans. Hence, the information signals are reproduced by detecting the change in the quantity of light irradiated on the light receiving element. The direction of the $-1$-st diffracted lights $Ea_{-1}$ and $Eb_{-1}$ is the geometrical reflecting direction of light on the track N (sloping surface 62b).

The reproducing spot 65 also scans over a part of the adjacent tracks $N-1$ and $N+1$, and the reflection and diffraction also occur on the sloping surfaces 62a and 63a. Diffracted lights $Ec_0$, $Ed_{-1}$, $Ed_{+1}$, $Ed_0$, $Ed_{-1}$, and $Ed_{+1}$ shown in FIG. 15C are obtained when the unrecorded parts of the sloping surfaces 62a and 63a are partially scanned by the reproducing spot 65. On the other hand, diffracted lights $Ee_0$, $Ee_{-1}$, $Ee_{+1}$, $Ef_0$, $Ef_{-1}$, and $Ef_{+1}$ shown in FIG. 15D are obtained when the recorded parts 64 of the sloping surfaces 62a and 63a are partially scanned by the reproducing spot 65. The diffracted lights from the adjacent tracks $N-1$ and $N+1$ generate the crosstalk.

The present inventors analyzed the diffraction distribution on the recording surface of the disc 60 by setting the width of the V-shaped groove to 1.6 μm, the depth of the V-shaped groove to $\frac{1}{4}$ the wavelength of the reproducing light beam, the change of the reflectivity to 1:1.3, and passing a laser beam having a wavelength of 780 nm through a condenser lens having a numerical aperture (NA) of 0.5. The results shown in FIGS. 16A and 16B were obtained.

FIG. 16A shows the diffraction distribution for the case where the reproducing spot 65 scans over the recorded part 64 of the track N, which recorded part 64 has a reflectivity of 1.3. In FIGS. 16A, a curve Ia shows the distribution for the case where the reproducing spot 65 scans a part of the unrecorded parts of the tracks $N-1$ and $N+1$, that is, the case where FIGS. 15B and 15C are combined. On the other hand, a curve IIa shows the distribution for the case where the reproducing spot 65 scans a part of the recorded parts 64 of the tracks $N-1$ and $N+1$, that is, the case where FIGS. 15B and 15D are combined. In FIGS. 16A and 16B, the optical axis of the condenser lens such as the condenser lens 16 shown in FIG. 16 is represented by Z.

FIG. 16B shows the diffraction distribution for the case where the reproducing spot 65 scans over the unrecorded part of the track N, which unrecorded part has a reflectivity of 1.0. In FIG. 16B, a curve IIIa shows the distribution for the case where the reproducing spot 65 scans a part of the unrecorded parts of the tracks $N-1$ and $N+1$, that is, the case where FIGS. 15A and 15C are combined. On the other hand, a curve IVa shows the distribution for the case where the reproducing spot 65 scans a part of the recorded parts 64 of the tracks $N-1$ and $N+1$, that is, the case where FIGS. 15A and 15D are combined.

Accordingly, an area $S_1$ which is the difference between the part surrounded by the curve Ia and the part surrounded by the curve IIa in FIG. 16A is the crosstalk component, and an area $S_2$ which is the difference between the part surrounded by the curve IIIa and the part surrounded by the curve IVa in FIG. 16B is the crosstalk component. In the reproducing apparatus, the light receiving element must be arranged at a position so as to avoid the receipt of the crosstalk component. Hence, the light receiving element is arranged at the end of the condenser lens so as to receive the light component corresponding to the overlapped portion between the curves Ia and IIa and the overlapped portion between the curves IIIa and IVa. In other words, the light receiving element is arranged to receive the light component within a range C at the end of the condenser lens, which condenser lens has a diameter B.

Because the light receiving element is arranged at a position deviated from the geometrical reflecting direction of light, the reproduced signal level becomes the difference between areas $S_3$ and $S_4$. However, since the areas $S_3$ and $S_4$ are small, the reproduced signal level becomes considerably small, and it is impossible to obtain a reproduced signal having a satisfactory S/N ratio.

It is possible to duplicate and mass produce the disc from an original disc by use of a stamper if the information signals were to be recorded on each sloping surface of the V-shaped groove as rows of pits. However, when the depth of the pits is approximately constant as in the case of the conventional flat surface disc of the type having pits, the crosstalk becomes a problem as will be described hereinafter.

FIGS. 17A and 17B show a conceivable disc 66 having pits. Each pit part 70 has a depth t and is formed in sloping surfaces 67b, 68a, 68b, 69a, and 69b of respective V-shaped grooves 67 through 69. The depth t corresponds to $\frac{1}{4}$ the wavelength of the reproduing light beam. The sloping surfaces 67b through 69b constitute the tracks $N-2$ through $N+2$, respectively. The reproducing spot 65 has the diameter D which is larger than the width P of each sloping surface but is smaller than the width 2P of each V-shaped groove. The reproducing spot 65 scans in the direction $A_1$, and the reflection and diffraction states on the sloping surfaces are as shown in FIGS. 18A through 18D.

When the reproducing spot 65 scans the track N and assumes the position $P_1$ where the non-pit part of the sloping surface 68b is irradiated by the reproducing spot 65, the diffracted lights $Ea_0$, $Ea_{-1}$, and $Ea_{+1}$ shown in FIG. 18A are obtained. In this case, the $-1$-st diffracting direction coincides with the geometrical reflecting direction of light and the intensity of the $-1$-st diffracted light $Ea_{-1}$ is the maximum.

When the reproducing spot 65 moves to the position $P_2$ where the pit part 70 of the sloping surface 68a is irradiated by the reproducing spot 65, the diffracted lights $Eb_0$, $Eb_{-1}$ and $Eb_{+1}$ shown in FIG. 18B are obtained. As may be seen from FIG. 18B, the intensities of the $-1$-st and $+1$-st diffracted lights increase. As a result, the quantity of diffracted light entering the condenser lens decreases, and the quantity of light irradiated on the light receiving element changes. Hence, the information signals are reproduced by detecting the change in the quantity of light irradiated on the light receiving element.

However, the reproducing spot 65 also scans over a part of the adjacent tracks $N-1$ and $N+1$, that is, the sloping surfaces 68a and 69a. Hence, the reflection and diffraction take place on the sloping surfaces 68a and 69a and the diffracted light causes the crosstalk. When the reproducing spot 65 is at the position $P_1$ shown in FIG. 17A and the reproducing spot 65 also scans a part of the non-pit parts of the sloping surfaces 68a and 69a, the diffracted lights $Ec_0$, $Ec_{-1}$, $Ed_{+1}$, $Ed_0$, $Ed_{-1}$, and $Ed_{+1}$ shown in FIG. 18C are obtained from the sloping surfaces 68a and 69a. On the other hand, when the reproducing spot 65 is at the position $P_2$ and the reproducing spot 65 also scans a part of the pit parts 70 of the sloping surfaces 68a and 69a, the diffracted lights $Ee_0$, $Ee_{-1}$, $Ee_{+1}$, $Ef_0$, $Ef_{-1}$, and $Ef_{+1}$ shown in FIG. 18D are obtained from the sloping surfaces 68a and 69a. The intensities of the 0-th diffracted lights $Ee_0$ and $Ef_0$ become smaller and the intensities of the $-1$-th diffracted lights $Ee_{-1}$ and $Ef_{-1}$ become larger, because the depth t of the pit parts 70 is approximately uniform and corresponds to $\frac{1}{4}$ the wavelength of the reproducing light beam.

Therefore, the $-1$-st diffracted lights $Ed_{-1}$, $Ed_{-1}$, $Ee_{-1}$, and $Ef_{-1}$ cause the crosstalk. Among these diffracted lights which cause the crosstalk, the intensities of the $-1$-st diffracted lights $Ec_{-1}$ and $Ed_{-1}$ from the non-pit parts are small and the angle of diffraction is constant, and hence, it is possible to design the reproducing apparatus so that the effects of the crosstalk caused by these $-1$-st diffracted lights $Ec_{-1}$ and $Ed_{-1}$ are reduced to a negligible extent. However, the $-1$-st diffracted lights $Ee_{-1}$ and $Ef_{-1}$ from the pit parts have an angle of diffraction greater than that of the above $-1$-st diffracted lights $Ec_{-1}$ and $Ed_{-1}$, and it is extremely difficult to design the reproducing apparatus so that the effects of the crosstalk caused by these $-1$-st diffracted lights $Ee_{-1}$ and $Ef_{-1}$ are reduced. As a result, the undesirable effects of the crosstalk as a whole cannot be reduced to a negligible extent according to the disc 66.

Figure 19A:
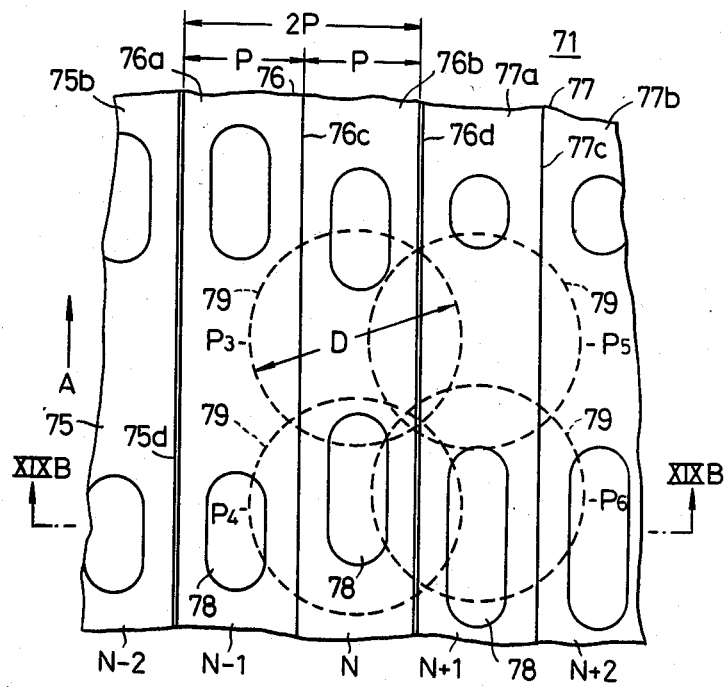
FIG. 19A is a plan view showing a part of an embodiment of the optical type disc according to the present invention on an enlarged scale.
Figure 19B:
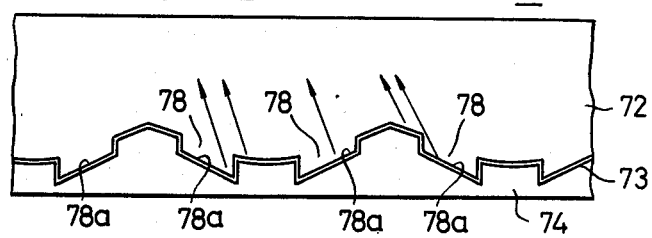
FIG. 19B shows the disc shown in FIG. 19A in a cross section along a line XIXB—XIXB.

Next, description will be given with respect to an embodiment of the optical type disc according to the present invention. FIGS. 19A and 19B show a part of the embodiment of the disc according to the present invention on an enlarged scale.

A disc 71 comprises a main disc body 72 which is made of a transparent resin, a reflection film 73 deposited on the lower surface of the main disc body 72 by sputtering, and a protecting film 74 which is adhered on the reflection film 73 so as to protect the reflection film 73. The disc 71 is placed on a turntable (not shown) of the reproducing apparatus with the main disc body 72 facing up, for example, and the disc 71 is rotated in the direction $A_1$ at a high speed so as to optically reproduce the information signals by use of the reproducing light beam.

V-shaped grooves 75 through 77 are formed contiguously on the lower surface of the main disc body 72, with the width of each V-shaped groove set to 2P. The V-shaped grooves 75 through 77 are a part of a spirally formed V-shaped groove or are concentrically formed V-shaped grooves. Each of sloping surfaces 75b through 77b of the V-shaped grooves 75 through 77, constitutes a track having a width P. The tracks are successively formed on the disc 71 from the outer periphery thereof toward the inner periphery thereof. FIGS. 19A and 19B show the tracks $N-2$ through $N+2$. The information signals are recorded on each of the sloping surfaces 75b through 77b (that is, the tracks $N-2$ through $N+2$) as rows of pit parts 78 when viewed from above the disc 71.

Figure 20:
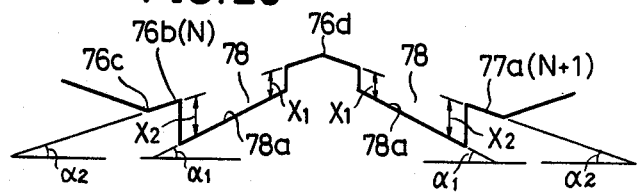
FIG. 20 shows the configuration of pits shown in FIG. 19B on an enlarged scale.

As shown on an enlarged scale in FIG. 20, the depth of the pit part 78 differs near a peak part 76d of the V-shaped groove 76 and near a valley part 76c of the V-shaped groove 76. The depth $X_1$ near the peak part 76d is less than $\frac{1}{4}$ the wavelength $\lambda$ of the reproducing light beam, and the depth $X_2$ near the valley part 76c is greater than $\lambda/4$. Further, the depth of the pit part 78 is also set so that an average depth is equal to $\lambda/4$, that is, so that $X_1 + X_2 = \lambda/2$. In addition, an inclination angle $\alpha_1$ of a bottom surface 78a of the pit part 78 is greater than an inclination angle $\alpha_2$ of the sloping surface 76b (or 77a).

Description will now be given with respect to the reflection and diffraction state of the reproducing light beam (laser beam) which forms a reproducing spot 79 on the tracks on the disc 71, especially with respect to the reflection and diffraction states on the adjacent tracks, by referring to FIGS. 21A through 21D and FIGS. 22A through 22D.

As shown in FIG. 19A, the reproducing spot 79 has the diameter D which is larger than the width P of the sloping surface 76b but is smaller than the width 2P of the V-shaped groove 76, as in the case of the reproducing spot 65 shown in FIG. 17A described before. Hence, the reproducing spot 79 also extends over a part of the tracks $N-1$ and $N+1$ which are adjacent to the track N which is being scanned.

Figure 21A:
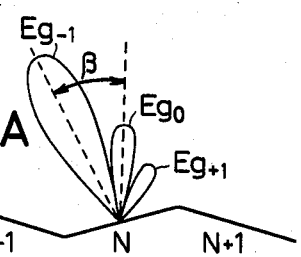
FIGS. 21A through 21D show reflection and diffraction states for the case where the track N of the disc shown in FIGS. 19A and 19B is scanned by the reproducing spot.
Figure 21B:
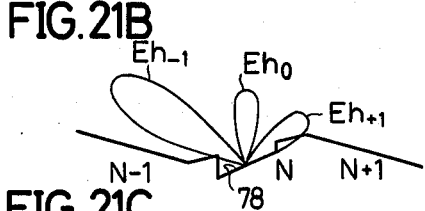
Figure 21C:
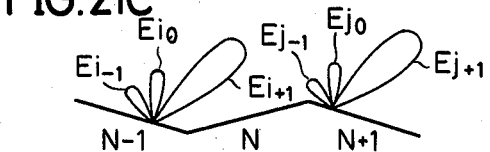
Figure 21D:
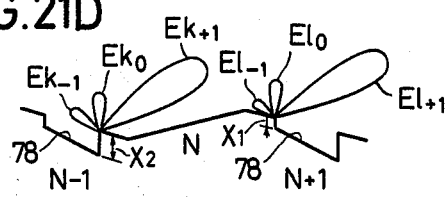

When the reproducing spot 79 is at a position $P_3$ shown in FIG. 19A and scans over the non-pit part of the track N, diffracted lights $Eg_0$, $Eg_{-1}$, and $Eg_{+1}$ shown in FIG. 21A are obtained as in the case shown in FIG. 18A. When the reproducing spot 79 moves to a position $P_4$ and scans over the pit part 78 of the track N, diffracted lights $Eh_0$, $Eh_{-1}$, and $Eh_{+1}$ shown in FIG. 21B are obtained as in the case shown in FIG. 18B. When the reproducing spot 79 is at the position $P_3$ and also scans over a part of the non-pit parts of the adjacent tracks $N-1$ and $N+1$, diffracted lights $Ei_0$, $Ei_{-1}$, and $Ei_{+1}$ shown in FIG. 21C are obtained from the track $N-1$ and diffracted lights $Ej_0$, $Ej_{-1}$, and $Ej_{+1}$ shown in FIG. 21C are obtained from the track $N+1$, as in the case shown in FIG. 18C. Further, when the reproducing spot 79 is at the position $P_4$ and also scans over a part of the pit parts 78 of the adjacent tracks $N-1$ and $N+1$, diffracted lights $Ek_0$, $Ek_{-1}$, and $Ek_{+1}$ shown in FIG. 21D are obtained from the track $N-1$ and diffracted lights $El_0$, $El_{-1}$, and $El_{+1}$ shown in FIG. 21D are obtained from the track $N+1$.

Figure 22A:
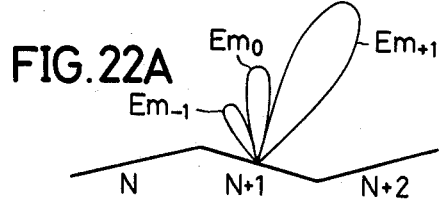
FIGS. 22A through 22D show reflection and diffraction states for the case where the track N+1 of the disc shown in FIGS. 19A and 19B is scanned by the reproducing spot.
Figure 22B:
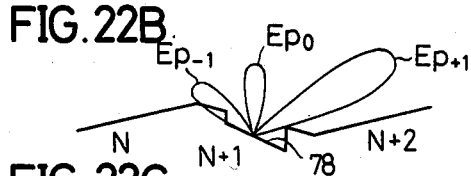
Figure 22C:
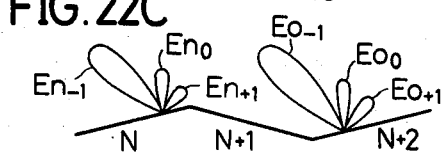
Figure 22D:
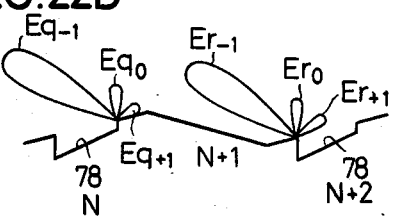

On the other hand, when the reproducing spot 79 finishes scanning over the track N and starts to scan over the track $N+1$, diffracted lights $Em_0$, $Em_{-1}$ and $Em_{+1}$ shown in FIG. 22A are obtained when the reproducing spot 79 is at a position $P_5$ shown in FIG. 19A and scans over the non-pit part of the track $N+1$. In this case, diffracted lights $En_0$, $En_{-1}$ and $En_{+1}$ shown in FIG. 22C are obtained when the reproducing spot 79 also scans over a part of the non-pit part of the adjacent track N, and diffracted lights $Eo_0$, $Eo_{-1}$, $Eo_{+1}$ shown in FIG. 22C are obtained when the reproducing spot 79 also scans over a part of the non-pit part of the adjacent track $N+2$. On the other hand, when the reproducing spot 79 moves to a position $P_6$ shown in FIG. 19A and scans over the pit part 78 of the track $N+1$, diffracted lights $Ep_0$, $Ep_{-1}$, $Ep_{+1}$ shown in FIG. 22B are obtained. In this case, diffracted lights $Eq_0$, $Eq_{-1}$ and $Eq_{+1}$ shown in FIG. 22D are obtained when the reproducing spot 79 also scans over a part of the pit part 78 of the adjacent track N, and diffracted lights $Er_0$, $Er_{-1}$, and $Er_{+1}$ shown in FIG. 22D are obtained when the reproducing spot 79 also scans over a part of the pit part 78 of the adjacent track $N+2$.

The present inventors analyzed the diffraction distribution for the case where the reproducing spot 79 scans over the track N, under the same conditions as those described before in conjunction with FIGS. 16A and 16B. The results shown in FIGS. 23A and 23B were obtained.

Figure 23A:
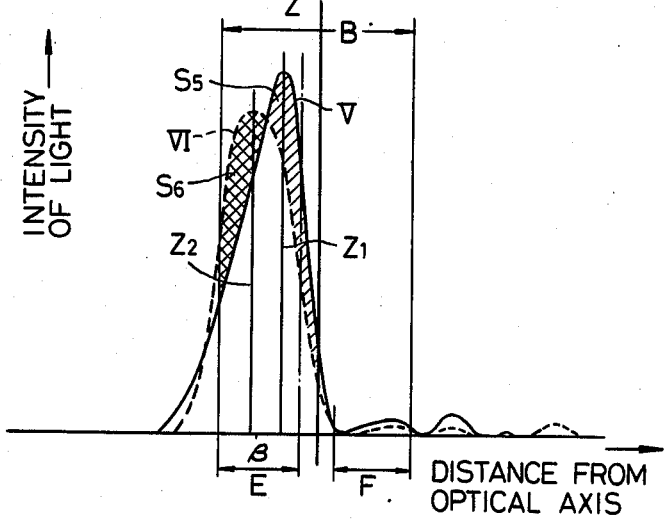

FIG. 23A shows the diffraction distribution for the case where the reproducing spot 79 scans over the non-pit part of the track N. A curve V shows the diffraction distribution for the case where the reproducing spot 79 also irradiates a part of the non-pit parts of the adjacent tracks N−1 and N+1, that is, for the case where FIGS. 21A and 21C are combined. A curve VI shows the diffraction distribution for the case where the reproducing spot 79 also irradiates a part of the pit parts 78 of the adjacent tracks N−1 and N+1, that is, for the case where FIGS. 21A and 21D are combined.

FIG. 23B shows the diffraction distribution for the case where the reproducing spot 79 scans over the pit part 78 of the track N. A curve VII shows the diffraction distribution for the case where the reproducing spot 79 also irradiates a part of the non-pit parts of the adjacent tracks N−1 and N+1, that is, for the case where FIGS. 21B and 21C are combined. A curve VIII shows the diffraction distribution for the case where the reproducing spot 79 also irradiates a part of the pit parts 78 of the adjacent tracks N−1 and N+1, that is, for the case where FIGS. 21B and 21D are combined.

As may be seen from FIG. 23A, the curve V is approximately distributed about an axis $Z_1$ and the curve VI is approximately distributed about an axis $Z_2$. In other words, the axis about which the diffraction distribution curve is distributed shifts depending on whether or not the parts of the adjacent tracks N−1 and N+1 which are also scanned by the reproducing spot 79 are non-pit parts or pit parts 78. The geometrical reflecting direction exists between the axes $Z_1$ and $Z_2$. This is because the angle of diffraction of the diffracted light is large when the pit parts 78 of the adjacent tracks N−1 and N+1 are also scanned by the reproducing spot 79 compared to the case where the non-pit parts of the adjacent tracks N−1 and N+1 are scanned by the reproducing spot 79, as shown in FIGS. 21C and 21D. Hence, the shift of the axis about which the diffraction distribution curve is distributed, can be used to eliminate the crosstalk as will be described hereinafter.

In other words, the crosstalk component corresponds to the difference between the area over which the curve V exceeds the curve VI and the area over which the curve VI exceeds the curve V. By appropriately setting a light receiving range E so as to include the axes $Z_1$ and $Z_2$, an area $S_5$ indicated by the hatchings over which the curve V exceeds the curve VI becomes equal to an area $S_6$ indicated by the cross-hatchings over which the curve VI exceeds the curve V. Thus, when the reproducing spot 79 is scanning over the pit part 78 of the track N, the quantity of light irradiated on the light receiving surfaces 19a and 19b of the light receiving element 19 shown in FIG. 24 does not change regardless of whether the part of the adjacent tracks N−1 and N+1 which are also scanned by the reproducing spot 79 are non-pit parts or pit parts 78. In addition, when the reproducing spot 79 is scanning over the non-pit part of the track N, the crosstalk from the adjacent tracks essentially becomes zero. FIG. 24 shows an essential part of a second embodiment of the reproducing apparatus according to the present invention, and in FIG. 24, those parts which are the same as those corresponding parts in FIG. 4 are designated by the same reference numerals.

When the reproducing spot 79 irradiates the pit part 78 of the track N, the angle of diffraction of the diffracted light increases as shown in FIG. 21B and deviate from the geometrical reflecting direction. For this reason, the diffracted lights are distributed as shown in FIG. 23B, and the intensity of light within the light receiving range E becomes essentially zero regardless of whether the part of the adjacent tracks N−1 and N+1 which are also scanned by the reproducing spot 79 are non-pit parts or pit parts 78. That is, since the light receiving range E is arranged in the geometrical reflecting direction, the light receiving range E which is set in FIG. 23A so as to eliminate the crosstalk, corresponds to a valley portion of each of the curves VII and VIII in FIG. 23B. Accordingly, the crosstalk from the adjacent tracks when the reproducing spot 79 is scanning over the pit part 78 of the track N also becomes essentially zero.

On the other hand, the light receiving surfaces 19a and 19b receive a large quantity of light when the reproducing spot 79 irradiates the non-pit part of the track N, and receive only a slight quantity of light when the reproducing spot 79 irradiates the pit part 78 of the track N. In other words, the quantity of light received by the light receiving surfaces 19a and 19b changes greatly, and a reproduced signal having a large level is obtained from the light receiving element 19.

Therefore, when the reproducing spot 79 scans over the track N, essentially no crosstalk is introduced from the adjacent tracks, and it is possible to obtain a reproduced signal having a large level and a satisfactory S/N ratio.

The light receiving range E is provided about the geometrical reflecting direction (direction of an angle $\beta$ indicated in FIG. 21A) of the 0-th diffracted light $22_0$ shown in FIG. 1 with respect to the sloping surface 76b which constitutes the track N. For this reason, the light receiving element 19 shown in FIG. 24 is arranged at such a position that the light receiving surfaces 19a and 19b exist in the geometrical reflecting direction.

When the reproducing spot 79 scans over the track N+1, the diffraction distribution curves which are obtained correspond to the curves V through VIII which are reversed about the optical axis Z. In this case, a light receiving range F is set symmetrically to the light receiving range E, about the optical axis Z. As in the case described before, the reproduced signal having a satisfactory S/N ratio is obtained from the light receiving element 19 which is arranged at such a position that the light receiving surfaces 19c and 19d exist in the geometrical reflecting direction of light on the sloping surface 77a which constitutes the track N+1.

Next, description will be given with respect to the method of obtaining the reproduced signal from the light receiving element 19 of the second embodiment of the reproducing apparatus.

As shown in FIG. 24, the light receiving element 19 is divided into the four light receiving surfaces 19a through 19d, along the width direction X of the V-shaped groove and along the extending direction Y of the V-shaped groove. The light receiving element 19 is arranged at such a position that the light receiving surfaces 19a and 19b correspond to the light receiving range E described before and the light receiving surfaces 19c and 19d correspond to the light receiving range F described before.

When the reproducing spot 79 is scanning over the track N, the diffracted lights transmitted through a condenser lens such as the condenser lens 16 shown in FIG. 1 irradiate parts of the light receiving surfaces 19a and 19b as indicated by the latchings in FIG. 24. On the other hand, when the reproducing spot 79 scans over the track N+1, the diffracted lights transmitted through the condenser lens irradiate parts of the light receiving surfaces 19c and 19d as indicated by the dot pattern in FIG. 24.

When the reproducing spot 79 scans over the track N, the information signals reproduced from the track N are obtained from the light receiving surfaces 19a and 19b. The outputs of the light receiving surfaces 19a and 19b are added in the adder 40, and the output of the adder 40 is passed through the switch 43 and obtained from the terminal 44. The switching signal described before is reproduced from the disc as the reproducing spot 79 moves from the track N to the track N+1, and the switching signal detector 42 generates the detection signal when the reproduced switching signal is detected. The switch 43 is switched over from the terminal 43b to the terminal 43c responsive to the output detection signal of the switching signal detector 42. Hence, when the reproducing spot 79 scans over the track N+1, the outputs of the light receiving surfaces 19c and 19d are added in the adder 41, and the output of the adder 41 is obtained through the switch 43 and the terminal 44.

Next, description will be given with respect to the diffracted light component which affects the crosstalk. When the reproducing spot 79 is scanning over the track N, the greatly diffracted lights $Eh_{-1}$ and $Eh_{+1}$ shown in FIG. 21B out of the diffracted lights from the tracks N, N−1, and N+1 do not enter the condenser lens, and the remaining diffracted lights are transmitted through the condenser lens and irradiated on the light receiving element 19. That is, the light distribution on the light receiving element 19 becomes as shown in FIG. 6A wherein the irradiated part $I_1$ of the −1-st diffracted lights $Eg_{-1}$, $Ei_{-1}$, $Ej_{-1}$, $Ek_{-1}$, and $El_{-1}$ is indicated by the hatchings and the irradiated part $I_2$ of the +1-st diffracted lights $Eg_{+1}$, $Ei_{+1}$, $Ej_{+1}$, $Ek_{+1}$, and $El_{+1}$ is indicated by the dot pattern within the circular region which is limited by the aperture of the condenser lens. In FIG. 6A, the two-dot chain lines indicate diffracted lights which do not enter the condenser lens.

Since the −1-st diffracted lights $Ef_{-1}$ which includes the information from the track N irradiates the part $I_1$, the information signals from the track N are obtained from the light receiving surfaces 19a and 19b as shown in FIG. 24, and the outputs of the light receiving surfaces 19a and 19b are added in the adder 40 and obtained through the switch 43 and the terminal 44.

When the reproducing spot 79 scans over the track N+1, the greatly diffracted lights $Ep_{-1}$ and $Ep_{+1}$ shown in FIG. 22B out of the diffracted lights from the tracks N+1, N, and N+2 do not enter the condenser lens, and the remaining diffracted lights are transmitted through the condenser lens and irradiated on the light receiving element 19. That is, the light distribution on the light receiving element 19 becomes as shown in FIG. 6A wherein the irradiated part $I_1$ of the −1-st diffracted lights $Em_{-1}$, $En_{-1}$, $Eo_{-1}$, $Eq_{-1}$, and $Er_{-1}$ is indicated by the hatchings and the irradiated part $I_2$ of the +1-st diffracted lights $Em_{+1}$, $En_{+1}$, $Eo_{+1}$, $Eq_{+1}$, and $Er_{+1}$ is indicated by the dot pattern within the circular region which is limited by the aperture of the condenser lens.

Because the −1-st diffracted light $Em_{-1}$ which includes the information from the track N+1 irradiates the part $I_2$, the information signals from the track N+1 are obtained from the light receiving surfaces 19c and 19d as shown in FIG. 24. The reproduced switching signal is detected in the switching signal detector 42 as the reproducing spot 79 moves from the track N to the track N+1, and the switch 43 is switched from the terminal 43b to the terminal 43c responsive to the output detection signal of the switching signal detector 42. Hence, the outputs of the light receiving surfaces 19c and 19d are added in the adder 41 and obtained through the switch 43 and the terminal 44.

Accordingly, the reproduced information signals are obtained from the terminal 44 in a state where essentially no crosstalk is obtained from the adjacent tracks. However, it is seen that when the reproducing spot 79 scans over the track N, the −1-st diffracted lights $Ei_{-1}$, $Ej_{-1}$, $Ek_{-1}$, and $El_{-1}$ cause the crosstalk. On the other hand, it is seen that when the reproducing spot 79 scans over the track N+1, the +1-st diffracted lights $En_{+1}$, $Eo_{+1}$, $Eq_{+1}$, and $Er_{+1}$ cause the crosstalk.

As may be seen by comparing FIGS. 21C and 21D with FIGS. 22C and 22D, the intensities of the −1-st diffracted lights $Ek_{-1}$ and $El_{-1}$ and the +1-st diffracted lights $Eq_{+1}$ and $Er_{+1}$ from the pit parts, are lower than the intensities of the −1-st diffracted lights $Ei_{-1}$ and $Ej_{-1}$ and the +1-st diffracted lights $En_{+1}$ and $Eo_{+1}$ from the non-pit parts. For this reason, the crosstalk caused by the −1-st diffracted lights $Ek_{-1}$ and $El_{-1}$ and the +1-st diffracted lights $Eq_{+1}$ and $Er_{+1}$ from the pit parts is small compared to the crosstalk caused by the −1-st diffracted lights $Ei_{-1}$ and $Ej_{-1}$ and the +1-st diffracted lights $En_{+1}$ and $Eo_{+1}$ from the non-pit parts. Therefore, the information signals can be recorded on the disc 71 with a high density, and the problem of crosstalk from the adjacent tracks will not occur at the time of the reproduction of the information signals from the disc 71.

Next, description will be given with respect to the reason why the intensities of the −1-st diffracted lights $Ek_{-1}$ and $El_{-1}$ are respectively lower than the intensities of the −1-st diffracted lights $Ei_{-1}$ and $Ej_{-1}$ and the intensities of the +1-st diffracted lights $Eq_{+1}$ and $Er_{+1}$ are respectively lower than the intensities of the +1-st diffracted lights $En_{+1}$ and $Eo_{+1}$.

The parts where the −1-st diffracted lights $Ek_{-1}$ and $El_{-1}$ occur in FIG. 21D, can be illustrated schematically as shown in FIGS. 25A and 25B, respectively. In FIG. 25A, it is assumed that the light impinging vertically at the right portion of the pit part 78 having a depth $T_1$, is diffracted with an angle $\psi$ of diffraction as rays a and b. An optical path difference $\Delta ab$ between the optical paths of the rays a and b can be described by the following equation (1).

$$\Delta ab = T_1 - A_x B_x \quad (1)$$
$$= T_1 - (A_x C_x - B_x C_x)$$
$$= T_1 - (L + T_1 \tan\psi)\sin\psi + T_1/\cos\psi$$
$$= T_1[1 + (1 - \sin^2\psi)/\cos\psi] - L\sin\psi$$
$$= T_1(1 + \cos)\psi - L\sin\psi$$

The following equation (2) can be obtained when the angle $\psi$ is small.

$$\Delta ab = 2T_1 - L\psi \quad (2)$$

The intensity of the diffracted light in the direction of the angle $\psi$ becomes zero when the optical path difference $\Delta ab$ is equal to $\lambda/2$. When the value $\lambda/2$ is substituted into Δab and the equation (2) is rewritten in terms of $T_1$, the following equation (3) is obtained.

$$T_1 = (\lambda/4) - [(L\psi)/2] \qquad (3)$$

It can be seen from the equation (3) that the intensity of the diffracted light in the leftward direction can be decreased when $T_1$ is set to a value which is slightly smaller than $\lambda/4$.

As described before, in the disc 71, the depth $X_1$ of the pit part 78 of the track N−1 at a position closer to the track N is set to a value which is smaller than $\lambda/4$. Accordingly, the intensity of the −1-st diffracted light $Ek_{-1}$ is lower than the intensity of the −1-st diffracted light $Ei_{-1}$ as shown in FIGS. 21C and 21D.

In FIG. 25B, it is assumed that the light impinging vertically at the left portion of the pit part 78 having a depth $T_2$, is diffracted with an angle $\psi$ of diffraction as rays c and d. An optical path difference Δcd between the optical paths of the rays c and d can be described by the following equation (4).

$$\begin{aligned}
\Delta cd &= T_2 + D_x F_x \qquad (4)\\
&= T_2 + (E_x F_x - D_x E_x)\\
&= T_2 + (L + T_2 \tan\psi)\sin\psi + T_2/\cos\psi\\
&= T_2[1 + (1 - \sin^2\psi)/\cos\psi] + L\sin\psi\\
&= T_2(1 + \cos\psi) + L\sin\psi
\end{aligned}$$

The following equation (5) can be obtained when the angle $\psi$ is small.

$$\Delta cd = 2T_2 = L\psi \qquad (5)$$

The intensity of the diffracted light in the direction of the angle $\psi$ becomes zero when the optical path difference Δcd is equal to $\lambda/2$. When the value $\lambda/2$ is substituted into Δcd and the equation (5) is rewritten in terms of $T_2$, the following equation (6) is obtained.

$$T_2 = (\lambda/4) = [(L\psi)/2] \qquad (6)$$

It can be seen from the equation (6) that the intensity of the diffracted light in the leftward direction can be decreased when $T_2$ is set to a value which is slightly larger than $\lambda/4$.

As described before, in the disc 71, the depth $X_2$ of the pit part 78 of the track N+1 at a position closer to the track N is set to a value which is larger than $\lambda/4$. Accordingly, the intensity of the −1-st diffracted light $El_{-1}$ is lower than the intensity of the −1-st diffracted light $Ej_{-1}$ as shown in FIGS. 21C and 21D.

Similarly, the intensities of the +1-st diffracted lights $Eq_{+1}$ and $Er_{+1}$ are respectively lower than the intensities of the +1-st diffracted lights $En_{+1}$ and $Eo_{+1}$ for the same reasons as those described above.

The average depth $(X_1+X_2)/2$ of the pit part 78 can be selected to a value between $\lambda/8$ and $\lambda/2$. However, it is desirable to set the average depth of the pit part 78 to $\lambda/4$ in order to minimize the 0-th diffracted light from the pit part 78.

Next, description will be given with respect to the method of manufacturing the disc 71 described heretofore. As will be described later on, the non-uniform depth of the pit part 78 is obtained by effectively utilizing the surface tension and gravity.

Figure 26:
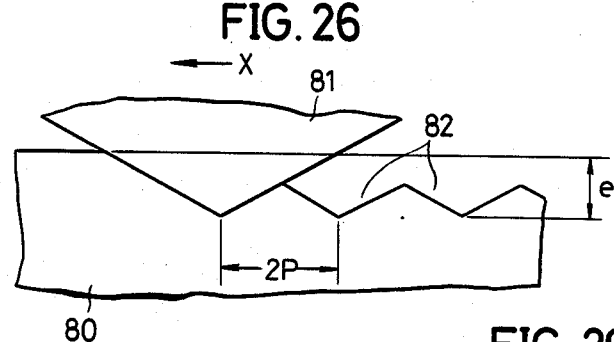
FIGS. 26 through 30 are diagrams for explaining processes of manufacturing a main body of the disc shown in FIGS. 19A and 19B.
Figure 27:
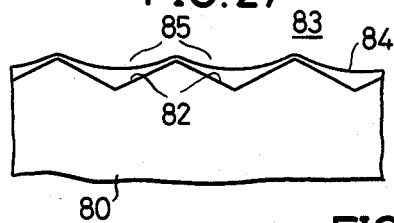

As shown in FIG. 26, a work 80 made of soft metal, is cut by a V-shaped cutting tool 81 made of diamond. The cutting tool 81 cuts into the top surface of the work 80 with a cutting depth e, and the cutting tool 81 is fed by a distance 2P in the direction X for each revolution of the work 80. As a result, a V-shaped groove 82 having the width 2P is spirally and contiguously formed on the top surface of the work 80. Next, a photoresist is coated on the work 80 having the V-shaped groove 82 by use of a spinner (not shown). When the photoresist dries and hardens, an unrecorded original disc 83 shown in FIG. 27 is obtained. The unrecorded original disc 83 has a photoresist film 84 formed on the top surface of the work 80, and a V-shaped groove 85 corresponding to the V-shaped groove 82 of the work 80 is formed on the surface of the photoresist film 84.

The information signals are recorded on the unrecorded original disc 83 in an optical recording apparatus. The recording apparatus has a construction similar to that of the reproducing apparatus shown in FIG. 1. The recording apparatus differs from the reproducing apparatus in that the recording apparatus uses a light beam of a shorter wavelength such as a cadmium gas laser beam in order to form pits which are smaller than the reproducing spot. Further, the recording apparatus employs a condenser lens having a larger number of aperture (NA), and the recording apparatus is provided with an optical (light) modulator for modulating the laser beam by the signal which is to be recorded. In addition, the intensity of the tracking spot is selected so as not to expose the photoresist, and the tracking spot is not modulated, so that the tracking error signal does not become distorted.

Figure 29:
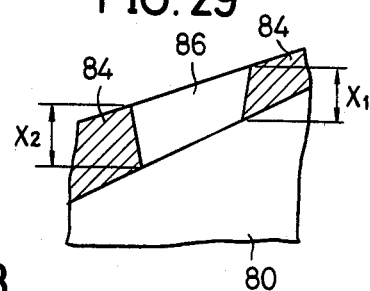
Figure 28:
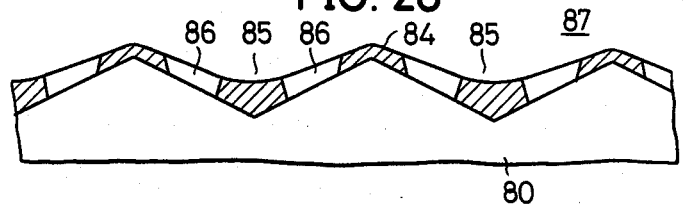

When the information signals are recorded in the recording apparatus and the original disc is subjected to a developing process, the photoresist film 84 is removed and pits 86 are formed as shown in FIGS. 28 and 29, and a recorded original disc 87 is obtained.

The photoresist coated on the top surface of the work 80, tends to become collected at the valley part of the V-shaped groove 82 due to the surface tension or gravity. As a result, the photoresist film 84 is thinner at the peak part of the V-shaped groove 82 and is thicker at the valley part of the V-shaped groove 82. Consequently, the depth of the pit 86 becomes shallower towards the peak part of the V-shaped groove 82 and deeper towards the valley part of the V-shaped groove 82, as shown on an enlarged scale in FIG. 29. The pit 86 having the depth $X_1$ of less than $\lambda/4$ nearer to the peak part, the depth $X_2$ of greater than $\lambda/4$ nearer to the valley part, and an average depth of $\lambda/4$, is obtained by controlling parameters such as the speed of the spinner, the viscosity of the photoresist, and the time required to harden the photoresist so that the thickness of the photoresist at the center of the sloping surface of the V-shaped groove 82 becomes $\lambda/4$.

Figure 30:
Figure 31:
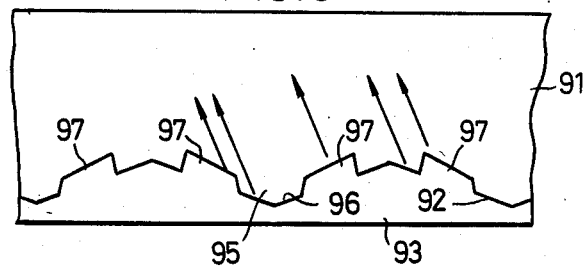
FIG. 31 shows another embodiment of the optical type disc according to the present invention.

A stamper (not shown) is formed from the recorded original disc 87 by a known method, and a plurality of main disc bodies 88 made of a transparent resin as shown in FIG. 30 is duplicated and mass produced by injection molding or the like. A reflection film and a protecting film are adhered on the duplicated main disc body 88 so as to obtain the disc 71 shown in FIGS. 19A and 19B.

Next, description will be given with respect to another embodiment of the disc according to the present invention. The second embodiment of the disc according to the present invention is generally shown in FIG.

31. A disc 90 is recorded with the information signals as rows of projections instead of the rows of pits, but otherwise, the disc 90 is basically the same as the disc 71 shown in FIGS. 19A and 19B. The disc 90 comprises a main disc body 91, a reflection film 92, and a protecting film 93. Each sloping surface 96 of a V-shaped groove 95 constitutes one track.

Figure 32:
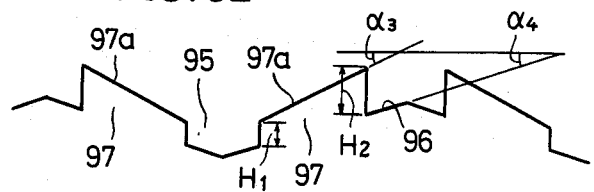
FIG. 32 shows the configuration of projections of the disc shown in FIG. 31 on an enlarged scale.

As shown in FIG. 32, a height $H_1$ of a projection 97 nearer to the valley part of the V-shaped groove 95 is less than $\lambda/4$, and a height $H_2$ of the projection 97 nearer to the peak part of the V-shaped groove 95 is greater than $\lambda/4$. An average height of the projection 97 is selected to a value between $\lambda/8$ and $\lambda/2$. Accordingly, an inclination angle $\alpha_3$ of an upper surface 97a of the projection 97 is greater than an inclination angle $\alpha_4$ of the sloping surface 96.

The disc 90 is played on a reproducing apparatus which is constructed similarly to the reproducing apparatus for playing the disc 71.

Figure 33A:
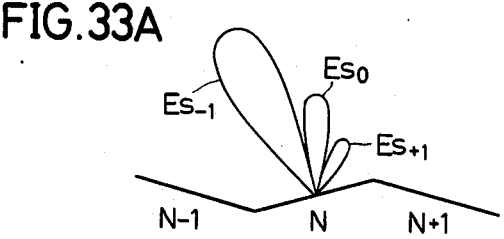
FIGS. 33A through 33D show reflection and diffraction states for the case where the track N of the disc shown in FIG. 31 is scanned by the reproducing spot.
Figure 33B:
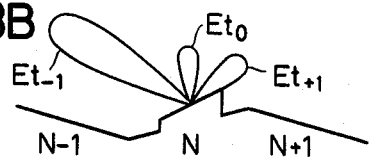
Figure 33C:
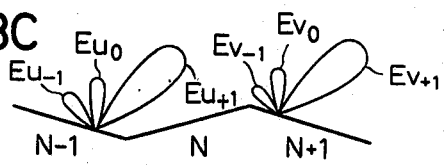
Figure 33D:
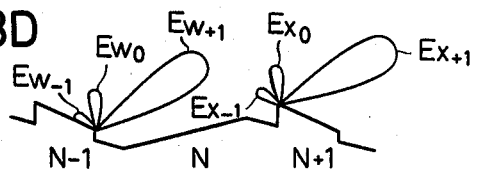

When the reproducing spot scans over the track N of the disc 90, 0-th diffracted light $Es_0$, $-1$-st diffracted light $Es_{-1}$, and $+1$-st diffracted light $Es_{+1}$ shown in FIG. 33A are obtained when the non-projection part of the track N is scanned, and diffracted lights $Et_0$, $Et_{-1}$ and $Et_{+1}$ shown in FIG. 33B are obtained when the projection 97 is scanned. Diffracted lights $Eu_0$, $Eu_{-1}$, $Eu_{30\ 1}$, $Ev_0$, $Ev_{-1}$, and $Ev_{+1}$ shown in FIG. 33C are obtained from the adjacent tracks $N-1$ and $N+1$ when the reproducing spot also scans a part of the non-projection parts of the adjacent tracks $N-1$ and $N+1$. On the other hand, diffracted lights $Ew_0$, $Ew_{-1}$, $Ew_{+1}$, $Ex_0$, $Ex_{-1}$, and $Ex_{+1}$ shown in FIG. 33D are obtained from the adjacent tracks $N-1$ and $N+1$ when the reproducing spot also scans a part of the projections of the adjacent tracks $N-1$ and $N+1$. The $-1$-st diffracted lights $Eu_{-1}$, $Ev_{-1}$, $Ew_{-1}$, and $Ex_{-1}$ are the crosstalk components, however, the intensities of the $-1$-st diffracted lights $Ew_{-1}$ and $Ex_{-1}$ from the projection 97 are even lower than the intensities of the $-1$-st diffracted lights $Eu_{-1}$ and $Ev_{-1}$ from the non-projection part, which $-1$-st diffracted lights $Eu_{-1}$ and $Ev_{-1}$ from the non-projection part do not cause the problem of crosstalk. Accordingly, the problem of crosstalk does not occur in the disc 90 and the information signals can be reproduced with a satisfactory S/N ratio, as in the case of the disc 71 described before.

The disc 90 can be duplicated from an original disc by use of a stamper, similarly as in the case of the disc 71 which is duplicated from the recorded original disc 87. Compared to the disc 71 described before, is it easier to duplicate the disc 90 from the original disc, and the disc 90 is suited for mass production.

Further, the present invention is not limited to these embodiments, but various variations and modifications may be made without departing from the scope of the present invention.

What is claimed is:

1. An optical type disc from which recorded information signals are optically reproduced by use of a light beam, said disc comprising:
   a main disc body;
   a recording surface formed on a surface of said main disc body; and
   a V-shaped groove formed spirally on the recording surface of said main disc body, said V-shaped groove consisting of a pair of sloping surfaces,
   each sloping surface of said V-shaped groove being recorded with information signals as rows of geometrical depressions or projections,
   an inclination angle of a bottom surface of the geometrical depression or a top surface of the geometrical projection being greater than an inclination angle of the sloping surface of said V-shaped groove.

2. An optical type disc as claimed in claim 1 in which the depth of said geometrical depression near a peak part of said V-shaped groove is set to a value which is less than ¼ the wavelength of said light beam and the depth of said geometrical depression near a valley part of said V-shaped groove is set to a value which is greater than ¼ the wavelength of said light beam, said geometrical depression having an average depth in a range of # to ½ the wavelength of said light beam.

3. An optical type disc as claimed in claim 1 in which the height of said geometrical projection near a peak part of said V-shaped groove is set to a value which is greater than ¼ the wavelength of said light beam and the height of said geometrical projection near a valley part of said V-shaped groove is set to a value which is less than ¼ the wavelength of said light beam, said geometrical projection having an average height in a range of ⅛ to ½ the wavelength of said light beam.

4. An optical type disc from which recorded information signals are optically reproduced by use of a light beam, said disc comprising:
   a main disc body;
   a recording surface formed on a surface of said main disc body; and
   a plurality of V-shaped grooves formed concentrically on the recording surface of said main disc body, each of said V-shaped grooves consisting of a pair of sloping surfaces,
   each sloping surface of the V-shaped groove being recorded with information signals as rows of geometrical depressions or projections,
   an inclination angle of a bottom surface of the geometrical depression or a top surface of the geometrical projection being greater than an inclination angle of the sloping surface of the V-shaped groove.

5. An optical type disc as claimed in claim 4 in which the depth of said geometrical depression near a peak part of the V-shaped groove is set to a value which is less than ¼ the wavelength of said light beam and the depth of said geometrical depression near a valley part of the V-shaped groove is set to a value which is greater than ¼ the wavelength of said light beam, said geometrical depression having an average depth in a range of ⅛ to ½ the wavelength of said light beam.

6. An optical type disc as claimed in claim 4 in which the height of said geometrical projection near a peak part of the V-shaped groove is set to a value which is greater than ¼ the wavelength of said light beam and the height of said geometrical projection near a valley part of the V-shaped groove is set to a value which is less than ¼ the wavelength of said light beam, said geometrical projection having an average height in a range of ⅛ to ½ the wavelength of said light beam.

7. An optical type reproducing apparatus for optically reproducing information signals from an optical type disc which is recorded with the information signals on each sloping surface of a spiral or concentric V-shaped grooves formed on a recording surface of the disc by relatively scanning the sloping surface of the V-shaped groove by a reproducing spot having a diameter smaller than the width of the V-shaped groove, each sloping surface of said V-shaped grooves constituting a track, said reproducing apparatus comprising:

an optical system including reproducing spot forming means and tracking spot forming means, said reproducing spot forming means forming a reproducing spot over a sloping surface of the V-shaped groove, said tracking spot forming means forming a tracking spot across two mutually adjacent sloping surfaces of the V-shaped grooves at a position deviated with respect to the reproducing spot in a width direction of the V-shaped groove by a distance of ¼ the width of the V-shaped groove;

photoelectric transducer means for independently receiving light reflected from the two mutually adjacent sloping surfaces of the V-shaped grooves; and moving means for moving said optical system in the width direction of the V-shaped groove responsive to an output of the photoelectric transducer means so that a center of the reproducing spot coincides with a center of a predetermined sloping surface of the V-shaped groove, said predetermined sloping surface constituting a track which is to be scanned.

8. An optical type reproducing apparatus as claimed in claim 7 in which said tracking spot forming means forms first and second tracking spots at positions deviated from the reproducing spot in mutually opposite directions along the width direction of the V-shaped groove by a distance of ¼ the width of the V-shaped groove, said photoelectric transducer means comprises first and second photoelectric transducer elements, said first photoelectric transducer element having a first pair of light receiving surfaces for independently receiving light reflected from two mutually adjacent sloping surfaces which are irradiated by said first tracking spot, said second photoelectric transducer element having a second pair of light receiving surfaces for independently receiving light reflected from two mutually adjacent sloping surfaces which are irradiated by said second tracking spot, and said moving means comprises circuit means and a driving device for moving said optical system responsive to an output signal of said circuit means, said circuit means generating the output signal by adding a first difference between outputs of said first pair of light receiving surfaces and a second difference between outputs of said second pair of light receiving surfaces.

9. An optical reproducing apparatus as claimed in claim 8 in which said circuit means inverts the polarity of the output signal responsive to the direction in which said predetermined sloping surface is inclined.

10. An optical reproducing apparatus as claimed in claim 7 in which said photoelectric transducer means comprises a photoelectric transducer element for reproducing the information signals from said predetermined sloping surface, said photoelectric transducer element being arranged in a geometrical reflecting direction of said reproducing spot from said predetermined sloping surface.

* * * * *